United States Patent
Park et al.

(10) Patent No.: US 9,886,130 B2
(45) Date of Patent: Feb. 6, 2018

(54) TOUCH SENSING DEVICE

(71) Applicants: Samsung Electronics Co., Ltd., Suwon-si, Gyeonggi-do (KR); KOREA ADVANCED INSTITUTE OF SCIENCE AND TECHNOLOGY, Daejeon (KR)

(72) Inventors: Sung-Soo Park, Suwon-si (KR); Chang-Byung Park, Daejeon (KR); Gyu-Hyeong Cho, Daejeon (KR)

(73) Assignees: Samsung Electronics Co., Ltd., Suwon-si (KR); Korea Advanced Institute of Science and Technology, Daejeon (KR)

(*) Notice: Subject to any disclaimer, the term of this patent is extended or adjusted under 35 U.S.C. 154(b) by 225 days.

(21) Appl. No.: 14/844,630

(22) Filed: Sep. 3, 2015

(65) Prior Publication Data

US 2016/0085375 A1    Mar. 24, 2016

(30) Foreign Application Priority Data

Sep. 24, 2014  (KR) .................. 10-2014-0127904

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ...... G06F 3/044; G06F 3/0418; G06F 3/0416; G06F 2203/04108
See application file for complete search history.

(56) References Cited

U.S. PATENT DOCUMENTS

| | | | |
|---|---|---|---|
| 2011/0090173 A1* | 4/2011 | Huang | G06F 3/044 345/174 |
| 2011/0273400 A1 | 11/2011 | Kwon et al. | |
| 2015/0338952 A1* | 11/2015 | Shahparnia | G06F 3/0418 345/174 |
| 2017/0017345 A1* | 1/2017 | Mo | G06F 3/0418 |
| 2017/0139539 A1* | 5/2017 | Yao | G06F 3/0418 |

\* cited by examiner

*Primary Examiner* — Abbas Abdulselam
(74) *Attorney, Agent, or Firm* — Jefferson IP Law, LLP

(57) ABSTRACT

A touch sensing device for measuring a contact position of an object by measuring a change in capacitance caused by contact of an object is provided. The touch sensing device includes a touch screen panel on which channel electrodes functioning as a transmission antenna or a reception antenna are disposed to form a plurality of electrode patterns, a transmission circuit connected to the channel electrodes to apply an electrical signal to the touch screen panel, a reception circuit connected to the channel electrodes to sense a varying capacitance from the plurality of electrode patterns, and a controller configured to control the touch screen panel, the transmission circuit and the reception circuit.

14 Claims, 23 Drawing Sheets

TOUCH SENSING DEVICE

CROSS-REFERENCE TO RELATED APPLICATION(S)

This application claims the benefit under 35 U.S.C. § 119(a) of a Korean patent application filed on Sep. 24, 2014 in the Korean Intellectual Property Office and assigned Serial No. 10-2014-0127904, the entire disclosure of which is hereby incorporated by reference.

JOINT RESEARCH AGREEMENT

The present disclosure was made by or on behalf of the below listed party to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd. and 2) Korea Advanced Institute of Science and Technology.

TECHNICAL FIELD

The present disclosure relates to a touch sensing device capable of improving touch sensitivity by effectively cancelling noise.

BACKGROUND

In mobile devices such as smart phones, which have been rapidly spread in recent years, a touch screen panel is generally provided to implement a variety of functions. In the past, a low-cost resistive touch screen was widely used. However, the resistive touch screen may cause deterioration of the quality of the display. Recently, therefore, the capacitive touch screen is widely used. As the touch screen panel is generally used in a mobile device, there is a need to develop a technology for more stably detecting or sensing a touch input in a noisy environment. In other words, to improve the sensitivity of a signal in the touch screen, efficient cancellation of the noise is required.

FIG. 1 illustrates an integrator circuit in which an inverting integrator circuit and a non-inverting integrator circuit are coupled for cancellation of noise according to the related art.

Referring to FIG. 1, a technique for cancelling noise may employ two integrators (i.e., a first integrator and a second integrator) in which the first integrator or the second integrator are used according to a clock signal CLK. This method for cancelling noise is disclosed in U.S. Patent Publication No. 2011-0273400, so a detailed description thereof will be omitted.

However, in the technique for cancelling noise as illustrated in FIG. 1, to accumulate charges in two feedback capacitors $C_{fb1}$ and $C_{fb2}$, separate operational amplifiers OP Amp 1 and OP Amp2 for their associated capacitors $C_{fb1}$ and $C_{fb2}$ are required. Therefore, since charges should be accumulated during a plurality of signal cycles, in order to extend the dynamic range, capacitances of the capacitors $C_{fb1}$ and $C_{fb2}$ should be increased, which is undesirable.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a touch sensing device capable of effectively cancelling noise while minimizing the size of a reception circuit electrically connected to a touch screen panel, using a plurality of capacitors connected to one operational amplifier.

Another aspect of the present disclosure is to provide a touch sensing device capable of quickly cancelling noise through an operation in which accumulation and output of a signal for a capacitor included in a reception circuit are performed at same time.

Another aspect of the present disclosure is to provide a touch sensing device capable of effectively cancelling noise through a differential operation regarding noise between adjacent channels.

Objects of the present disclosure will not be limited to the above-described objects, and other unmentioned objects are will be clearly understood from the following description by those skilled in the art.

In accordance with an aspect of the present disclosure, a touch sensing device for measuring a contact position of an object by measuring a change in capacitance caused by contact of an object is provided. The touch sensing device may include a touch screen panel, on which channel electrodes functioning as a transmission antenna or a reception antenna are disposed, configured to form a plurality of electrode patterns, a transmission circuit connected to the channel electrodes and configured to apply an electrical signal to the touch screen panel, a reception circuit connected to the channel electrodes and configured to sense a varying capacitance from the plurality of electrode patterns, and a controller configured to control the touch screen panel, the transmission circuit and the reception circuit. The reception circuit may include a demodulation circuit, and the demodulation circuit may include an operational amplifier and a plurality of feedback capacitors electrically connected to the operational amplifier. Charges relating to signals having different parity properties may be controlled by the controller so as to be accumulated in each of a first group capacitor and a second group capacitor among the plurality of feedback capacitors.

In accordance with another aspect of the present disclosure, a touch sensing device for measuring a contact position of an object by measuring a change in capacitance caused by contact of an object is provided. The touch sensing device may include a touch screen panel, on which channel electrodes functioning as a transmission antenna or a reception antenna are disposed, configured to form a plurality of electrode patterns, a transmission circuit connected to the channel electrodes and configured to apply an electrical signal to the touch screen panel, a reception circuit connected to the channel electrodes and configured to sense a varying capacitance from the plurality of electrode patterns, and a controller configured to control the touch screen panel, the transmission circuit and the reception circuit. The reception circuit may include a demodulation circuit, the demodulation circuit may include an operational amplifier and a plurality of feedback capacitors electrically connected to the operational amplifier, and the reception circuit further may include an accumulation circuit for accumulating output signals of the feedback capacitors. Charges relating to signals having different parity properties may be controlled by the controller so as to be accumulated in each of a first group capacitor and a second group capacitor among the plurality of feedback capacitors.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
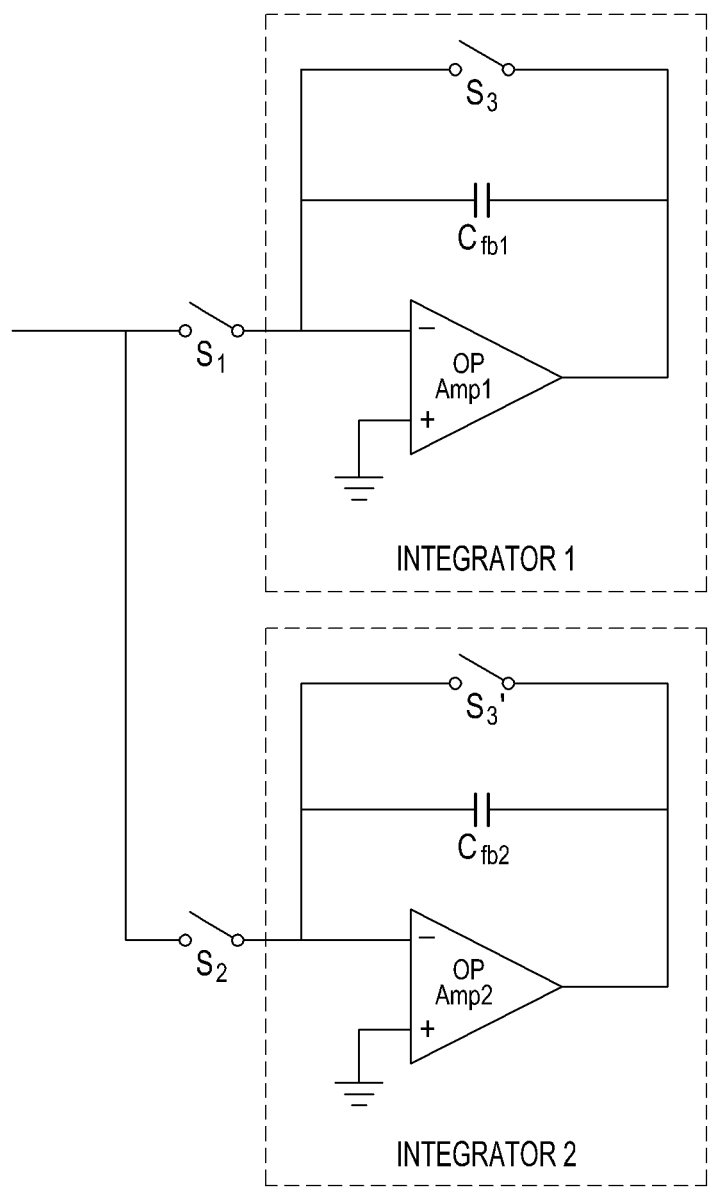
FIG. 1 illustrates an integrator circuit in which an inverting integrator circuit and a non-inverting integrator circuit are coupled for cancellation of the noise according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, operations, elements, and/or components, but do not preclude the presence or addition of one or more other features, integers, operations, elements, components, and/or groups thereof.

As used herein, the term "A or B" or "at least one of A and/or B" includes any and all combinations of one or more of the associated listed items. For examples, "A or B" or "at least one of A or/and B" each may include A, or include B, or include both A and B.

Ordinal numbers as herein used, such as "first", "second", etc., may modify various components of various embodiments, but do not limit those components. For example, these terms do not limit the order and/or importance of the components. These terms are only used to distinguish one component from another. For example, a first user device and a second user device are different user devices from each other. For example, according to various embodiments of the present disclosure, a first component may be denoted a second component, and vice versa without departing from the scope of the present disclosure.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

The terms as used herein are provided merely to describe some embodiments thereof, but not to limit the present disclosure.

Unless otherwise defined, all terms including technical and scientific terms used herein have the same meaning as commonly understood by one of ordinary skill in the art to which the various embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An electronic device, to which a touch sensing device according to various embodiments of the present disclosure can be applied, may include at least one of a smart phone, a tablet personal computer (PC), or a smart watch. It will be apparent to those of ordinary skill in the art that the electronic device according to various embodiments of the present disclosure is not limited to the above-described devices.

Figure 2:
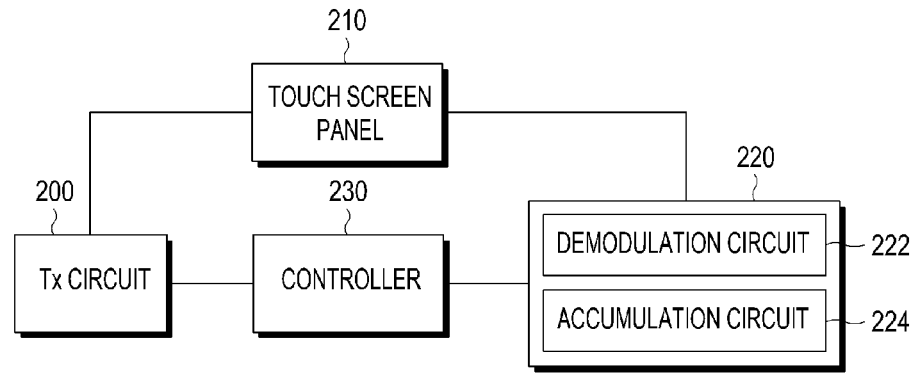
FIG. 2 is a block diagram illustrating a structure of a touch sensing device according to an embodiment of the present disclosure.
Figure 3:
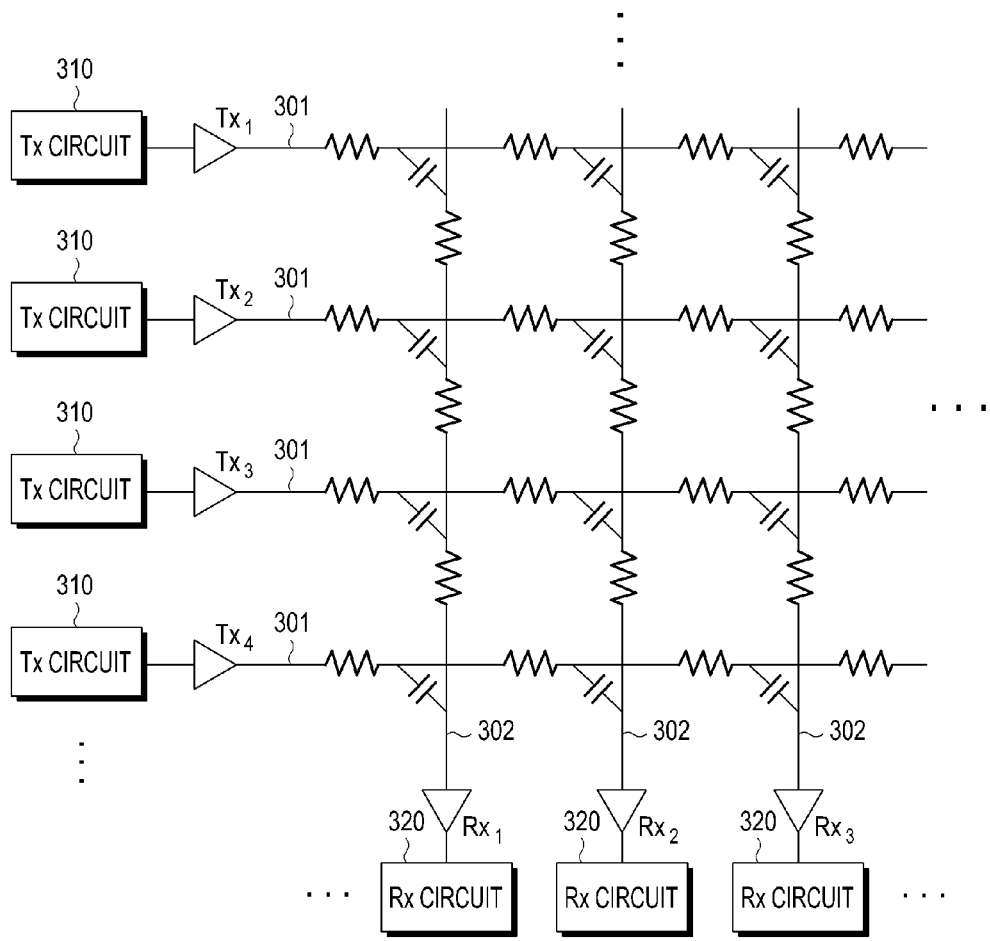
FIG. 3 illustrates an operation principle of recognizing a user's touch by a touch sensing device according to an embodiment of the present disclosure.

FIG. 2 is a block diagram illustrating a structure of a touch sensing device according to an embodiment of the present disclosure, and FIG. 3 illustrates an operation principle of recognizing a user's touch by a touch sensing device according to an embodiment of the present disclosure.

Referring to FIGS. 2 and 3, a touch sending device according to an embodiment of the present disclosure may include a transmission (Tx) circuit 200, a touch screen panel 210, a reception (Rx) circuit 220, and a controller 230.

The transmission circuit 200 may be electrically connected to the touch screen panel 210 to apply a variety of electrical signals to the touch screen panel 210. The electrical signal may be a pulse signal for measuring, for example, the change in capacitance. Examples of the electrical signal are illustratively mentioned to describe various embodiments of the present disclosure, and the electrical signal is not limited thereto. As illustrated in FIG. 3, the electrical signal may be applied to a transmission antenna 301 that is electrically connected to the transmission circuit 200 or 310.

The touch screen panel 210 may provide, to the controller 230, the data relating to a user's touch that is made through the touch screen panel 210. As for the touch screen panel 210, as shown in FIG. 3, the transmission antenna(s) 301 and a reception antenna(s) 302 may be arranged in the form of a Cartesian coordinate system to form a plurality of electrode patterns. In some embodiments, the transmission antenna 301 may be referred as a driving electrode, and the reception antenna 302 may be referred to as a sensing electrode. The reception antenna 302 may be electrically connected to the reception circuit 220 or 320 according to an embodiment of the present disclosure. The reception circuit 220 or 320 may be electrically connected to the reception antenna 302 to detect a change in capacitance of the touch screen panel 210. Detecting the change in capacitance may correspond to detecting a change in capacitance of the touch screen panel 210 in response to a touch input made by, for example, the user's finger(s). For example, in response to the user's touch, not only the signal related to the touch input but also the noise may be input to the reception circuit 220 or 320. As described above, in order to implement the high signal-to-noise ratio (SNR) of the touch screen, the touch sensing device should be designed so that the input noise may be effectively cancelled. Accordingly, the reception circuit 220 or 320 according to an embodiment of the present disclosure may include a demodulation circuit 222 and an accumulation circuit 224. The demodulation circuit 222 may perform a function/functions or operation/operations for accumulating a signal related to the touch input. The accumulation circuit 224 may accumulate a signal/signals output from the demodulation circuit 222. The reception circuit 220 or 320 may be configured to output the signal from which the noise is cancelled through a differential operation according to several embodiments. A more detailed explanation of function/functions or operation/operations performed by the demodulation circuit 222 and the accumulation circuit 224 will be described later.

The controller 230 may be electrically connected to the transmission circuit 200 or 310 and the reception circuit 220 or 320, to control the transmission circuit 200 or 310 and the reception circuit 220 or 320 to perform their associated function/functions or operation/operations.

The transmission circuit 200 or 310 and the reception circuit 220 or 320 may include at least one channel (e.g., Tx1 to Tx4, and Rx1 to Rx3).

Figure 4:
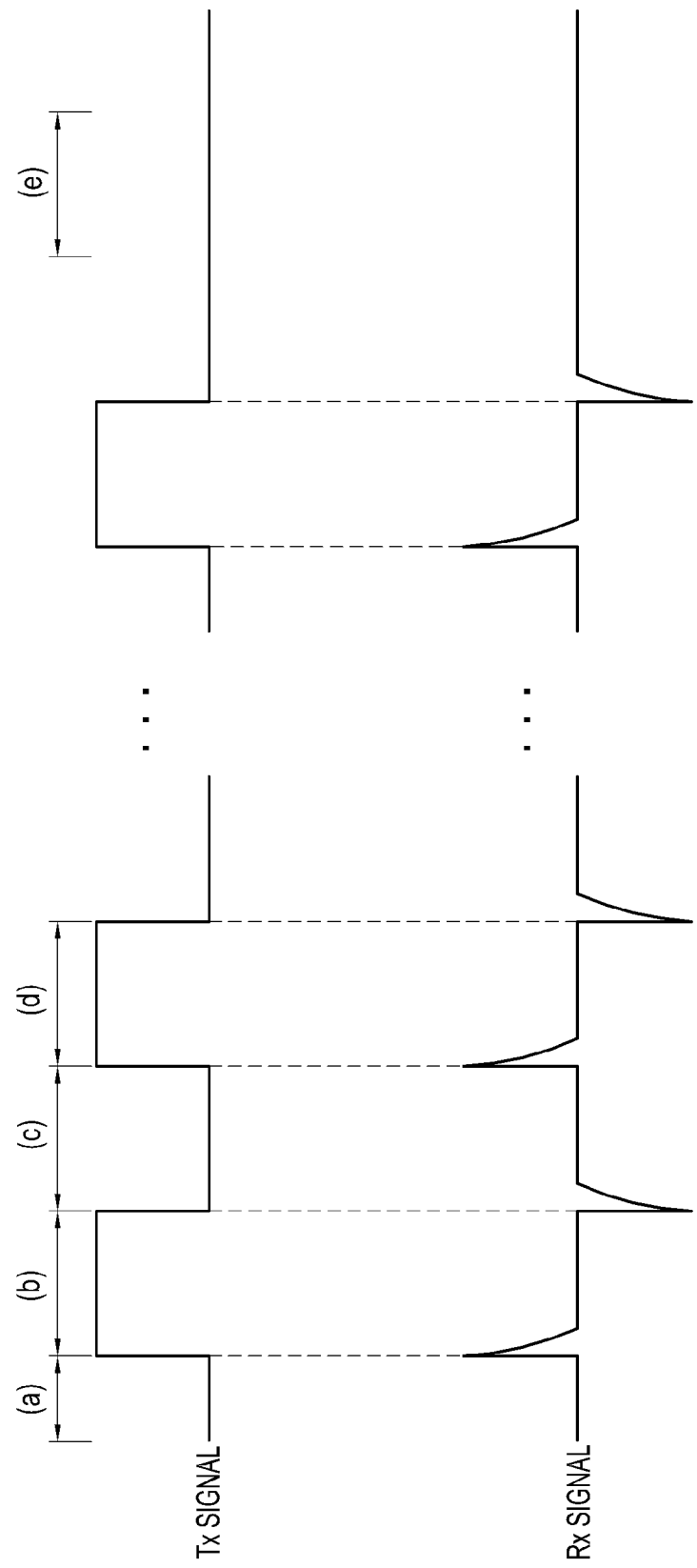
FIG. 4 illustrates a transmission signal and a reception signal according to an embodiment of the present disclosure.

FIG. 4 illustrates a transmission signal and a reception signal according to an embodiment of the present disclosure.

Referring to FIG. 4, the transmission circuit 200 may transmit a transmission signal shown in FIG. 4 to the touch screen panel 210. A waveform of the transmission signal may be, for example, a periodic symmetrical square wave as shown in FIG. 4. In this specification, for convenience of description, the term 'transmission signal' may be interchangeably used with the term 'electrical signal'. In response to the transmission signal transmitted to the touch screen panel 210, a reception signal shown in FIG. 4 may be applied to the reception circuit 220. In other words, a positive (+) charge corresponding to an increase in voltage may be applied to the reception circuit 220 at the rising edge of the transmission signal, and a negative (−) charge corresponding to a decrease in voltage may be applied to the reception circuit 220 at the falling edge of the transmission signal. Further, the change by the touch input may cause a change in the positive charge and the negative charge which are generated in response to the same transmission signal.

Figure 5:
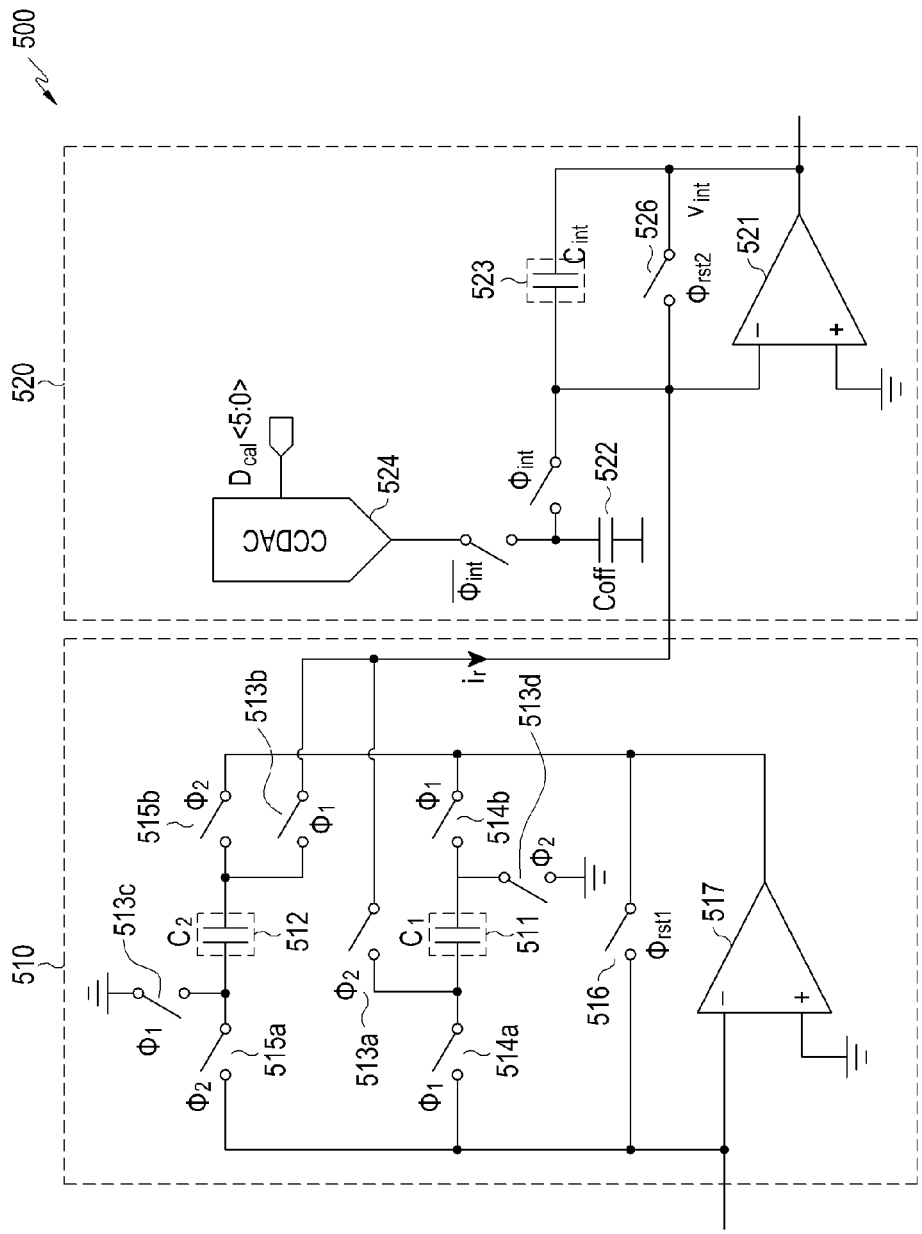
FIG. 5 illustrates a demodulation circuit and an accumulation circuit included in a reception circuit according to an embodiment of the present disclosure.

FIG. 5 illustrates a demodulation circuit and an accumulation circuit included in a reception circuit according to an embodiment of the present disclosure.

Referring to FIG. 5, a demodulation circuit 510 according to an embodiment of the present disclosure may include an operational amplifier 517, a first feedback capacitor 511, and a second feedback capacitor 512. The first feedback capacitor 511 and the second feedback capacitor 512 may be electrically connected to the first operational amplifier 517. According to various embodiments of the present disclosure, the first feedback capacitor 511 may be described as being included in a first group capacitor, and the second feedback capacitor 512 may be described as being included in a second group capacitor. Each of the first group capacitor and the second group capacitor may include at least one capacitor.

Referring to FIG. 5, a (1-1)-th switch 514a and a (1-2)-th switch 514b may be disposed on both ends of the first feedback capacitor 511. The (1-1)-th switch 514a and the (1-2)-th switch 514b may be referred to as a first switching unit 514a and 514b according to various embodiments of the present disclosure.

Referring to FIG. 5, a (2-1)-th switch 515a and a (2-2)-th switch 515b may be disposed on both ends of the second feedback capacitor 512. The (2-1)-th switch 515a and the (2-2)-th switch 515b may be referred to as a second switching unit 514a and 514b according to various embodiments of the present disclosure.

Further, the demodulation circuit 510 according to an embodiment of the present disclosure may include a (3-1)-th switch 513a, a (3-2)-th switch 513b, a (3-3)-th switch 513c and a (3-4)-th switch 513d.

The demodulation circuit 510 according to an embodiment of the present disclosure may include a reset switch 516 for reset (rst) of the operational amplifier 517. The term 'reset' may be interchangeably used with the term 'initialization' in some embodiments.

An accumulation circuit 520 according to an embodiment of the present disclosure may include an offset compensation capacitor 522. The offset compensation capacitor 522 may be electrically connected to a constant-current digital analog (D/A) converter (CCDAC) 524. The accumulation circuit 520 may include an integrator, and the integrator may include a capacitor 523, a reset switch 526, and an operational amplifier 521.

FIGS. 6A to 6D illustrate a flow of a signal in a demodulation circuit according to an embodiment of the present disclosure, in first to fourth times according to an embodiment of the present disclosure.

Figure 6A:
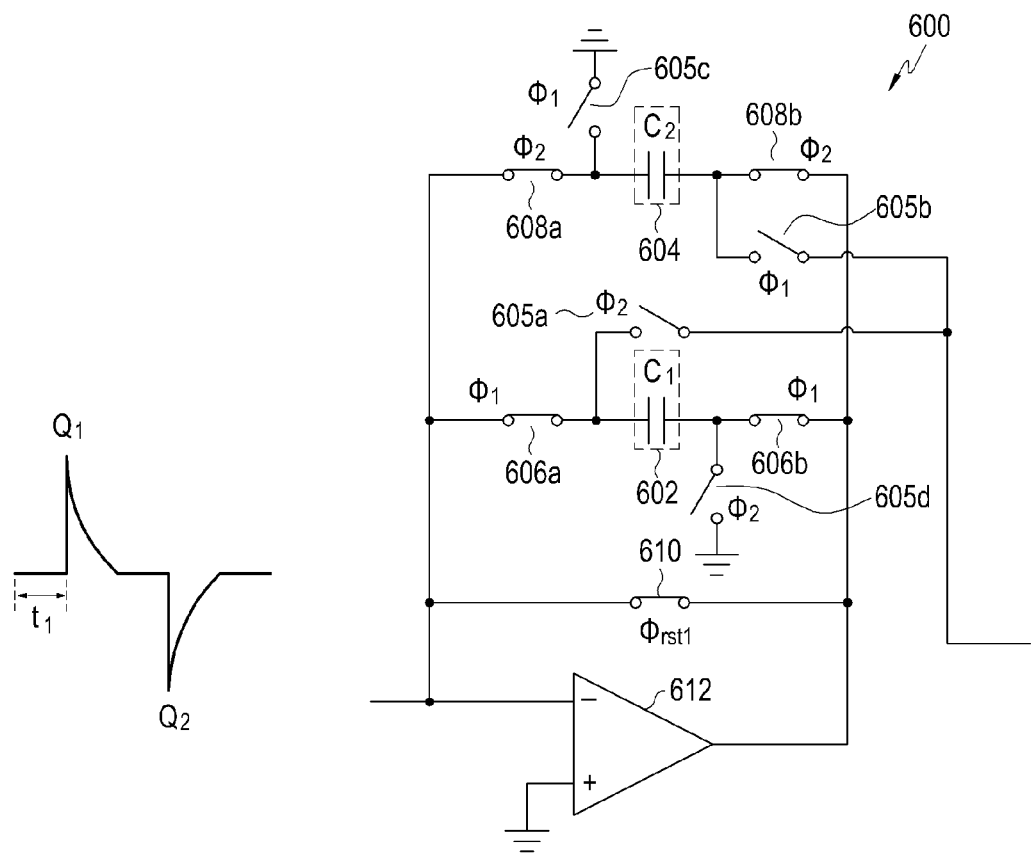
FIGS. 6A, 6B, 6C, and 6D illustrate a flow of a signal in a demodulation circuit according to an embodiment of the present disclosure, in first to fourth times according to an embodiment of the present disclosure.

Referring to FIG. 6A, during a first time (e.g., in a case where a phase of the transmission signal corresponds to (a) in FIG. 4) according to an embodiment of the present disclosure, an operational amplifier 612, a first feedback capacitor 602 and a second feedback capacitor 604 of a demodulation circuit 600 may be controlled to be reset. To this end, during the first time according to an embodiment of the present disclosure, a reset switch 610, a first switching unit 606a and 606b, and a second switching unit 608a and 608b may be controlled to be closed (i.e., short-circuited) for a predetermined time, so the operational amplifier 612, the first feedback capacitor 602 and the second feedback capacitor 604 may be reset. Furthermore, a (3-1)-th switch 605a, a (3-2)-th switch 605b, a (3-3)-th switch 605c and a (3-4)-th switch 605d may be in the open position.

Figure 6B:
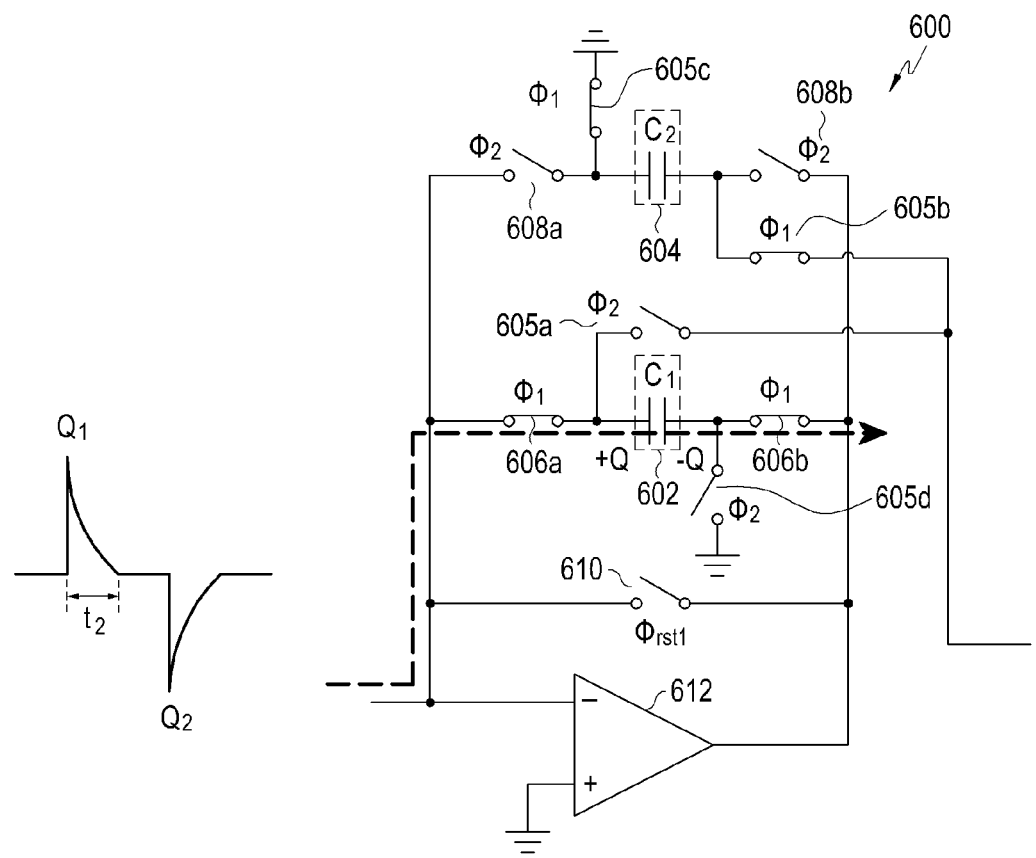

Referring to FIG. 6B, during a second time (e.g., a rising edge period of the transmission signal, i.e., a period corresponding to (b) in FIG. 4) according to an embodiment of the present disclosure, a positive charge corresponding to the rise of a voltage may be input to a demodulation circuit 600. During the second time according to an embodiment of the present disclosure, the first switching unit 606a and 606b may be controlled by a controller (e.g., the controller 230) so as to be closed (i.e., short-circuited) as are switches 605b and 605c. Therefore, charges +Q and −Q corresponding to the rise of a voltage may be accumulated at both ends of the first feedback capacitor 602 according to the input signal.

Figure 6C:
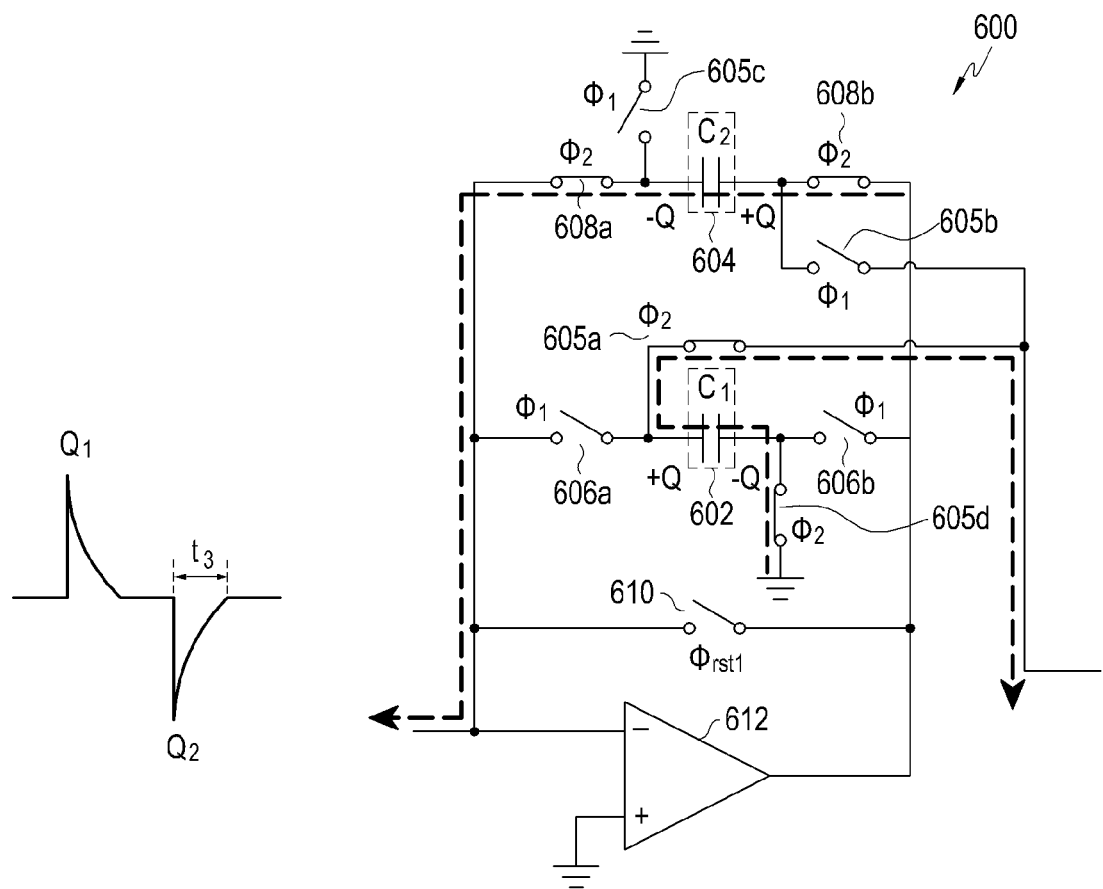

Referring to FIG. 6C, during a third time (e.g., in a period where a phase of the transmission signal corresponds to a falling edge period, i.e., a period corresponding to (c) in FIG. 4) according to an embodiment of the present disclosure, a negative charge corresponding to the drop of a voltage may be input to the demodulation circuit 600. During the third time according to an embodiment of the present disclosure, as soon as a charge is accumulated in the second feedback capacitor 604 as the second switching unit 608a and 608b is closed (i.e., short-circuited), the charge accumulated in the first feedback capacitor 602 may be controlled by the controller (e.g., the controller 230) so as to be output. In order to output the charge accumulated in the first feedback capacitor 602, the controller may control switches 605a and 605d to be closed (i.e., short-circuited). The charge/charges output by the first feedback capacitor 602 may be accumulated in a capacitor (e.g., the capacitor 523) included in the accumulation circuit (e.g., the accumulation circuit 520) for a predetermined time. Charges −Q and +Q corresponding to the drop of a voltage may be accumulated at both ends of the second feedback capacitor 604 according to the input signal. In this way, charges having different parity properties may be controlled by the controller so as to be accumulated in each of the first feedback capacitor 602 (or a first group capacitor) and the second feedback capacitor 604 (or a second group capacitor).

Figure 6D:
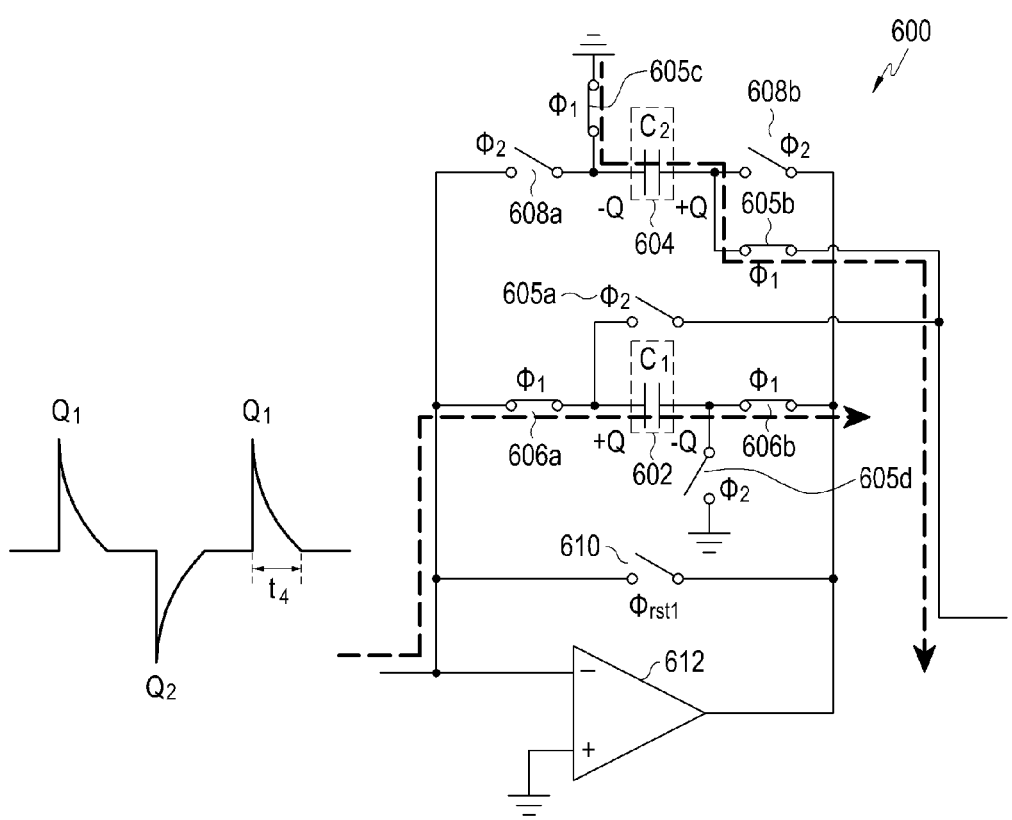

Referring to FIG. 6D, during a fourth time (e.g., in a case where a phase of the transmission signal corresponds to (d) in FIG. 4) according to an embodiment of the present disclosure, as soon as the charge accumulated in the second feedback capacitor 604 is output, charge may be controlled to be accumulated in the first feedback capacitor 602. In order to output the charge accumulated in the second feedback capacitor 604, the controller may control switches 605b and 605c so as to be closed (i.e., short-circuited). Further, in order to accumulate charge in the first feedback capacitor 602, the controller may control the first switching unit 606a and 606b so as to be closed (i.e., short-circuited). The charge/charges output by the second feedback capacitor 604 may be accumulated in the capacitor (e.g., the capacitor 523) included in the accumulation circuit (e.g., the accumulation circuit 520) for a predetermined time.

The controller may repeatedly perform the function/functions or operation/operations described with reference to FIGS. 6B to 6D, a predetermined number of times (e.g., 30 times). After repeating the function/functions or operation/operations, if it reaches a fifth time (e.g., a case where a phase of the transmission signal corresponds to (e) in FIG. 4) according to an embodiment of the present disclosure, the controller may detect the signal accumulated in the capacitor (e.g., the capacitor 523).

After detecting the signal accumulated in the capacitor (e.g., the capacitor 523), the controller may reset the capacitor 523 using a reset switch (e.g., the switch 526), and then perform the function/functions or operation/operations described with reference to FIGS. 6B to 6D, or FIGS. 6A to 6D again.

The charge accumulated in capacitors of the demodulation circuit 600 may include a charge generated by the transmission signal and a charge accumulated by the noise. The noise included in the charge/charges may be generally a low-frequency noise of a frequency lower than the frequency of a transmission pulse that is used in measuring the capacitance. The positive charge (e.g., $Q_1$) may be represented as a sum ($Q_1$=S+N) of an input signal S by the transmission pulse and a charge +N generated by the low-frequency noise. Further, the negative charge (e.g., $Q_2$) may be represented as a sum ($Q_2$=−S+N) of an input signal −S by the transmission pulse and a charge +N generated by the low-frequency noise. When the capacitors (e.g., the capacitors 602 and 604) of the demodulation circuit 600 are connected to the accumulation circuit (e.g., the accumulation circuit 520), the capacitor (e.g., the capacitor 602) that has accumulated $Q_1$ and the capacitor (e.g., the capacitor 604) that has accumulated $Q_2$ may be connected in different directions, so the capacitor 523 of the accumulation circuit 520 may accumulate a difference (e.g., $Q_1-Q_2$=S+N−(31 S+N)=2S) between two charges. In this manner, the capacitor of the accumulation circuit may accumulate only the signal from which the low-frequency noise is cancelled.

Figure 7:
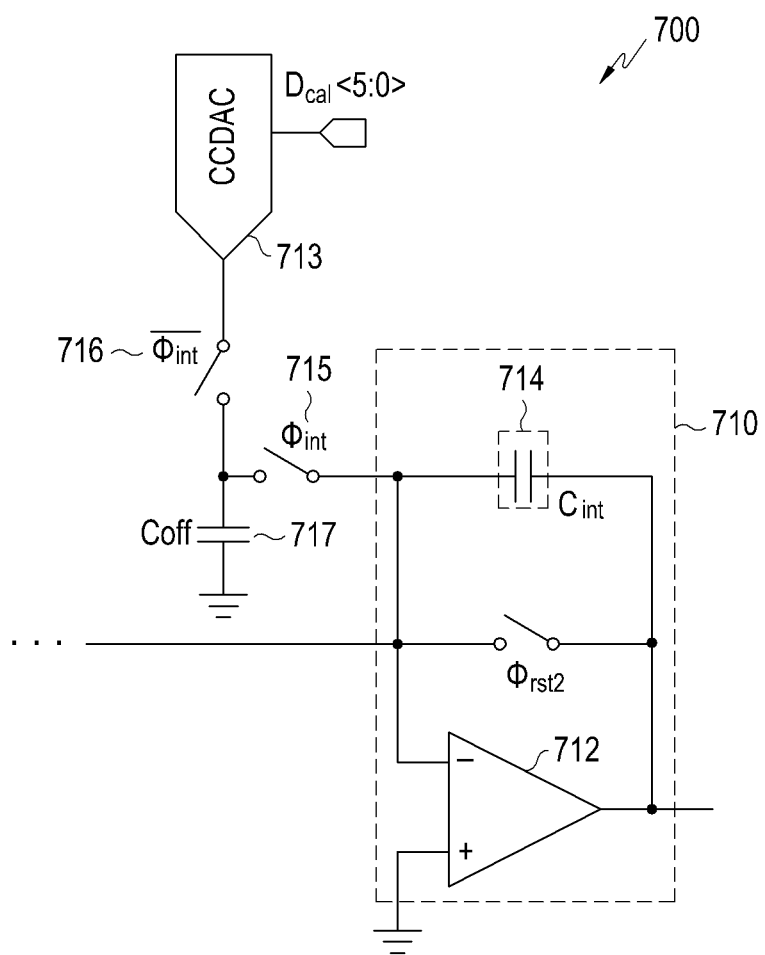
FIG. 7 illustrates an example in which an offset compensation capacitor is included in the accumulation circuit according to an embodiment of the present disclosure.

FIG. 7 illustrates an example in which an offset compensation capacitor is included in the accumulation circuit according to an embodiment of the present disclosure.

In sensing a touch input based on the change in capacitance, even in a case where the touch is not made (e.g., even before the touch input is made), a capacitance of a predetermined value may exist in the touch sensing device. In this specification, for convenience of description, this will be referred to as 'offset capacitance', and the term 'offset capacitance' may be expressed in various ways according to various embodiments. The offset capacitance may cause deterioration of the sensitivity, since the dynamic range should be increased in sensing the touch input. Therefore, a circuit capable of minimizing the offset capacitance is required, and the touch sensing device according to an embodiment of the present disclosure may include various element/elements for minimizing the offset capacitance.

Referring to FIG. 7, the accumulation circuit 700 may include an offset compensation capacitor $C_{off}$ 717 and an integrator 710. The offset compensation capacitor 717 may be charged for a predetermined time by a CCDAC 713. The integrator 710 may include a capacitor 714 and an operational amplifier 712. If charges of a first feedback capacitor (e.g., the first feedback capacitor 602) and a second feedback capacitor (e.g., the second feedback capacitor 604) are output to the accumulation circuit 700, the accumulation circuit 700 may accumulate a charge that offsets the signal caused by the offset capacitance, in the offset compensation capacitor 717, and output the accumulated charge to the capacitor 714. Accordingly, the accumulation circuit 700 may offset the signal caused by the offset capacitance. As a result, it is not necessary to increase the dynamic range according to the offset capacitance, making it possible to implement the high sensitivity.

For example, assuming that a change in capacitance, which should be sensed, is 0.1 picofarad (pF) and the offset capacitance existing in a touch screen panel (e.g., the touch screen panel 210) is 9.9 pF, if there is no offset compensation, a capacitor for sensing capacitance of 10 pF (=9.9 pF+0.1 pF) is required in order to sense the change (e.g., 0.1 pF) in capacitance. However, if the offset compensation is applied as in an embodiment of the present disclosure, a capacitor for sensing capacitance of 0.1 pF may be used. Therefore, the capacitor (e.g., the capacitor 714) for sensing the change in capacitance may be reduced in size. Further, assuming that a signal of the accumulation circuit is sensed with a sensing circuit having a resolution of $1/100$, if there is no offset compensation, the touch sensing device may have the sensitivity of 10 pF/100=0.1 pF. On the other hand, if the offset compensation is applied, the touch sensing device may have the sensitivity of 0.1 pF/100=0.001 pF, making it possible to implement a touch sensing device having the high sensitivity.

The offset compensation capacitor 717 according to an embodiment of the present disclosure may be electrically connected to and charged by the CCDAC 713 that functions or operates as a power source. For example, if a phase of the transmission signal corresponds to (b) in FIG. 4, a switch 716 may be controlled by a controller (e.g., the controller 230) so as to be closed (i.e., short-circuited). Accordingly, the offset compensation capacitor 717 may be charged. Further, for example, if a phase of the transmission signal corresponds to (c) in FIG. 4, a switch 715 may be controlled by the controller so as to be closed (i.e., short-circuited) and the switch 716 may be controlled by the controller so as to be opened, so the function or operation of the offset compensation may be performed. The CCDAC 713 may be replaced by a constant-voltage power supply. For example, a constant-voltage digital analog converter (CVDAC) may be used in place of the CCDAC 713.

Figure 8:
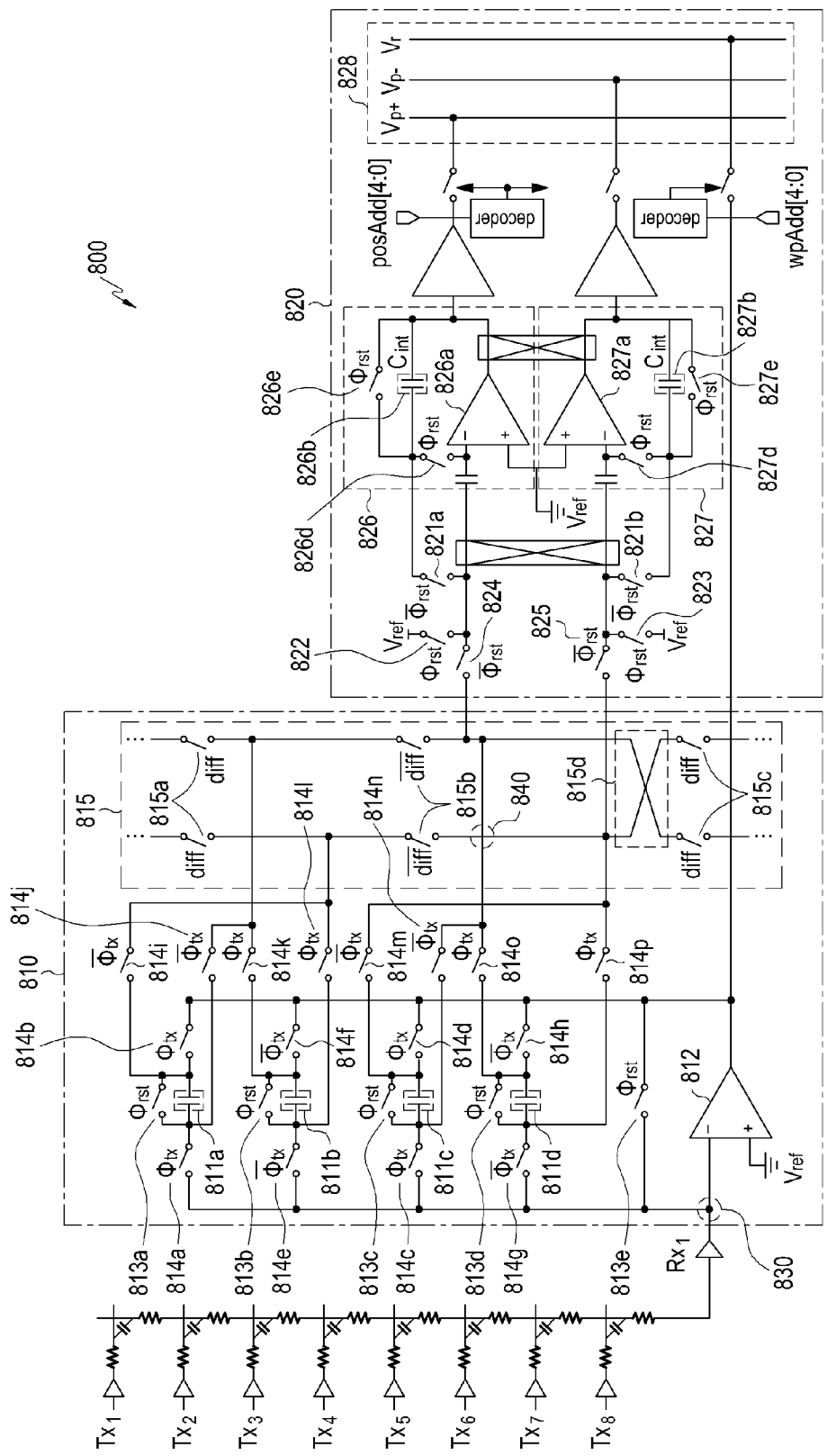
FIG. 8 illustrates a demodulation circuit, a mode selector, and an accumulation circuit included in a reception circuit according to an embodiment of the present disclosure.

FIG. 8 illustrates a demodulation circuit, a mode selector and an accumulation circuit included in a reception circuit according to another embodiment of the present disclosure.

Referring to FIG. 8, a reception circuit 800 according to another embodiment of the present disclosure may include a demodulation circuit 810, a mode selector 815 and an accumulation circuit 820. The demodulation circuit 810 according to another embodiment of the present disclosure may include a first feedback capacitor 811*a*, a second feedback capacitor 811*b*, a third feedback capacitor 811*c* and a fourth feedback capacitor 811*d*. The first to fourth feedback capacitors 811*a*, 811*b*, 811*c* and 811*d* may be electrically connected to an operational amplifier 812. The demodulation circuit 810 may further include reset switches 813*a*, 813*b*, 813*c*, 813*d*, and 813*e*. Also, the demodulation circuit 810 may include switches 814*a* and 814*b*, 814*c* and 814*d*, 814*e* and 814*f*, and 814*g* and 814*h*, as well as switches 814*i*, 814*j*, 814*k*, 814*l*, 814*m*, 814*n*, 814*o*, and 814*p*.

The mode selector 815 may control at least one switch 815*a*, 815*b* and 815*c* included in the mode selector 815, to control the reception circuit to operate in a single mode in which the reception circuit receives a signal of a single channel, or in a differential mode in which the reception circuit receives a signal difference between different channels. For convenience of description, the mode selector 815 may be referred to as a 'third switching unit' as needed.

The first to fourth feedback capacitors 811*a*, 811*b*, 811*c* and 811*d* may be electrically connected to the mode selector 815 through a plurality of switch combinations as shown in FIG. 8. Further, the mode selector 815 may include a cross unit 815*d*. The cross unit 815*d* may be configured to accumulate a signal difference between difference channels in the accumulation circuit 820, if the reception circuit 800 operates in the differential mode. A description thereof will be given below.

The accumulation circuit 820 may be electrically connected to the demodulation circuit 810. The accumulation circuit 820 may include a first integrator 826, a second integrator 827 and a signal output unit 828. The first integrator 826 and the second integrator 827 may share some circuit with each other for improvement of their characteristics. The first integrator 826 and the second integrator 827 may each include an operational amplifier 826*a* and 827*a* and a capacitor 826*b* and 827*b*. As shown in FIG. 8, both ends of each of the first to fourth feedback capacitors 811*a*, 811*b*, 811*c* and 811*d* may be electrically connected to input ends of the first integrator 826 and the second integrator 827, respectively. The accumulation circuit 820 may further include reset switches 822, 823, 826*d*, 826*e*, 827*d* and 827*e* as well as 821*a*, 821*b*, 824 and 825.

Hereinafter, for convenience of description, the first and third feedback capacitors 811*a* and 811*c* may be referred to as a first group capacitor, and the second and fourth feedback capacitors 811*b* and 811*d* may be referred to as a second group capacitor. Further, in this specification, a dot (e.g., a dot 830) shown in the drawing is for indicating an electrical connection of the circuit. In other words, a point where the dot is marked may indicate an electrically connected point, and may mean that transmission means (e.g., conducting wires) of a signal are connected to each other. On the contrary, a point (e.g., a point 840), at which the conducting wires seem to be connected to each other on the drawing but the dot is not marked, may indicate a point where actually the conducting wires are not electrically connected to each other.

FIGS. 9A to 9D illustrate a flow of a signal in a reception circuit according to another embodiment of the present disclosure in first to fourth times according to an embodiment of the present disclosure.

A reception circuit 900 according to another embodiment of the present disclosure may operate in a single mode or a differential mode. In the single mode, an accumulation circuit may operate so as to accumulate only the signal that is received at a single channel (e.g., a channel Rx1). In the differential mode, an accumulation circuit (e.g., an accumulation circuit 1020*b*) included in any one channel (e.g., a channel Rx2) among different channels may operate so as to accumulate a difference between signals that are received at different channels (e.g., the channel Rx1 and the channel Rx2). The single mode or the differential mode may be selected by the user, or may be specified in advance. FIGS.

9A to 9D illustrate a function or operation performed by the reception circuit 900 according to another embodiment of the present disclosure.

Figure 9A:
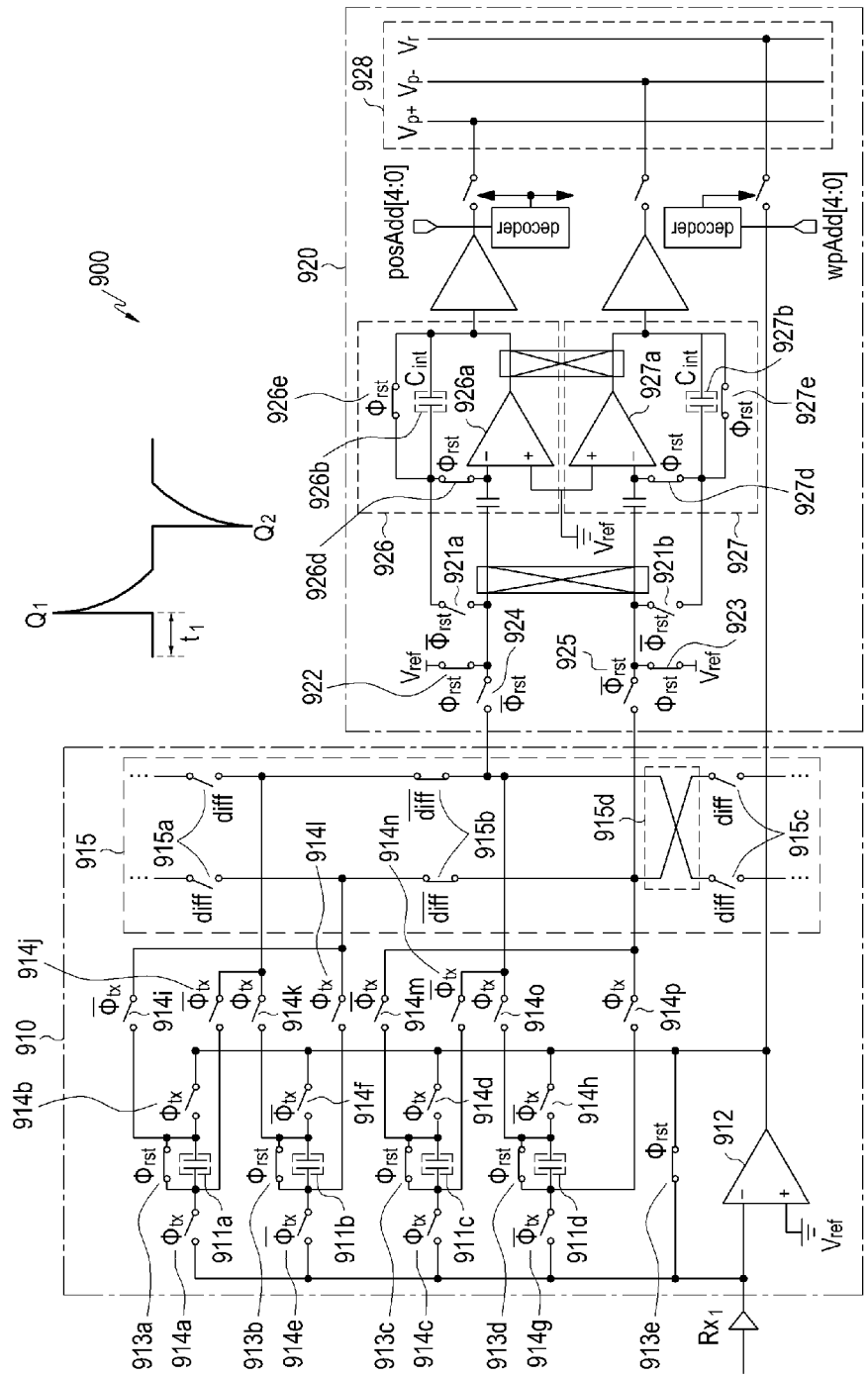
FIGS. 9A, 9B, 9C, and 9D illustrate a flow of a signal in a reception circuit in first to fourth times according to another embodiment of the present disclosure.

Referring to FIG. 9A, during a first time (e.g., in a case where a phase of the transmission signal corresponds to (a) in FIG. 4) according to an embodiment of the present disclosure, Φrst switches (e.g., reset switches 913a, 913b, 913c, 913d, 913e, 922, 923, 926d, 926e, 927d and 927e) may be controlled by a controller (e.g., the controller 230) so as to be closed (i.e., short-circuited) for a predetermined time, so that an operational amplifier 912 and first to fourth feedback capacitors 911a, 911b, 911c and 911d may be controlled to be reset. For the single-mode operation, a switch 915b of a mode selector 915 may be controlled to be closed (i.e., short-circuited), and switches 915a and 915c of the mode selector 915 may be controlled to be opened. If the reset is completed, the Φrst switches may be controlled to be opened and $\overline{\varphi}$rst switches 921a, 921b, 924 and 925 may be controlled to be closed (i.e., short-circuited), for accumulation of a signal.

Figure 9B:
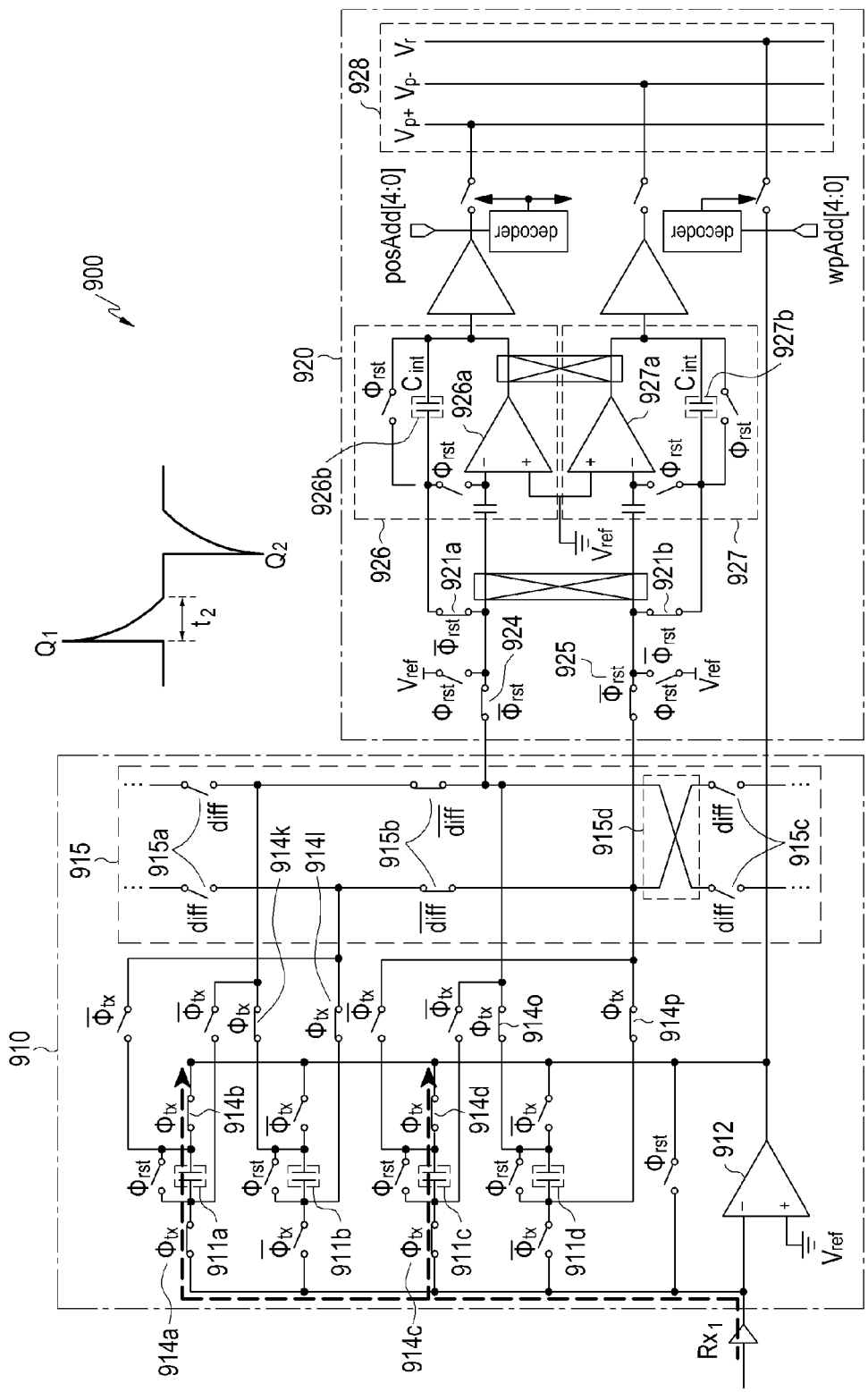

Referring to FIG. 9B, during a second time (e.g., in a case where a phase of the transmission signal corresponds to (b) in FIG. 4) according to an embodiment of the present disclosure, a positive charge corresponding to the rising edge of the transmission signal may be input to a demodulation circuit 910. During the second time according to an embodiment of the present disclosure, Φtx switches 914a, 914b, 914c, 914d, 914k, 914l, 914o and 914p may be controlled by the controller 230 so as to be closed (i.e., short-circuited). Therefore, charges +Q and −Q corresponding to the rise of a voltage may be accumulated at both ends of the first feedback capacitor 911a and the third feedback capacitor 911c according to the input signal. For convenience of description of the reception circuit 900 according to another embodiment of the present disclosure, the switches 914a, 914b, 914c and 914d may be referred to as a first switching unit 914a, 914b, 914c and 914d.

Figure 9C:
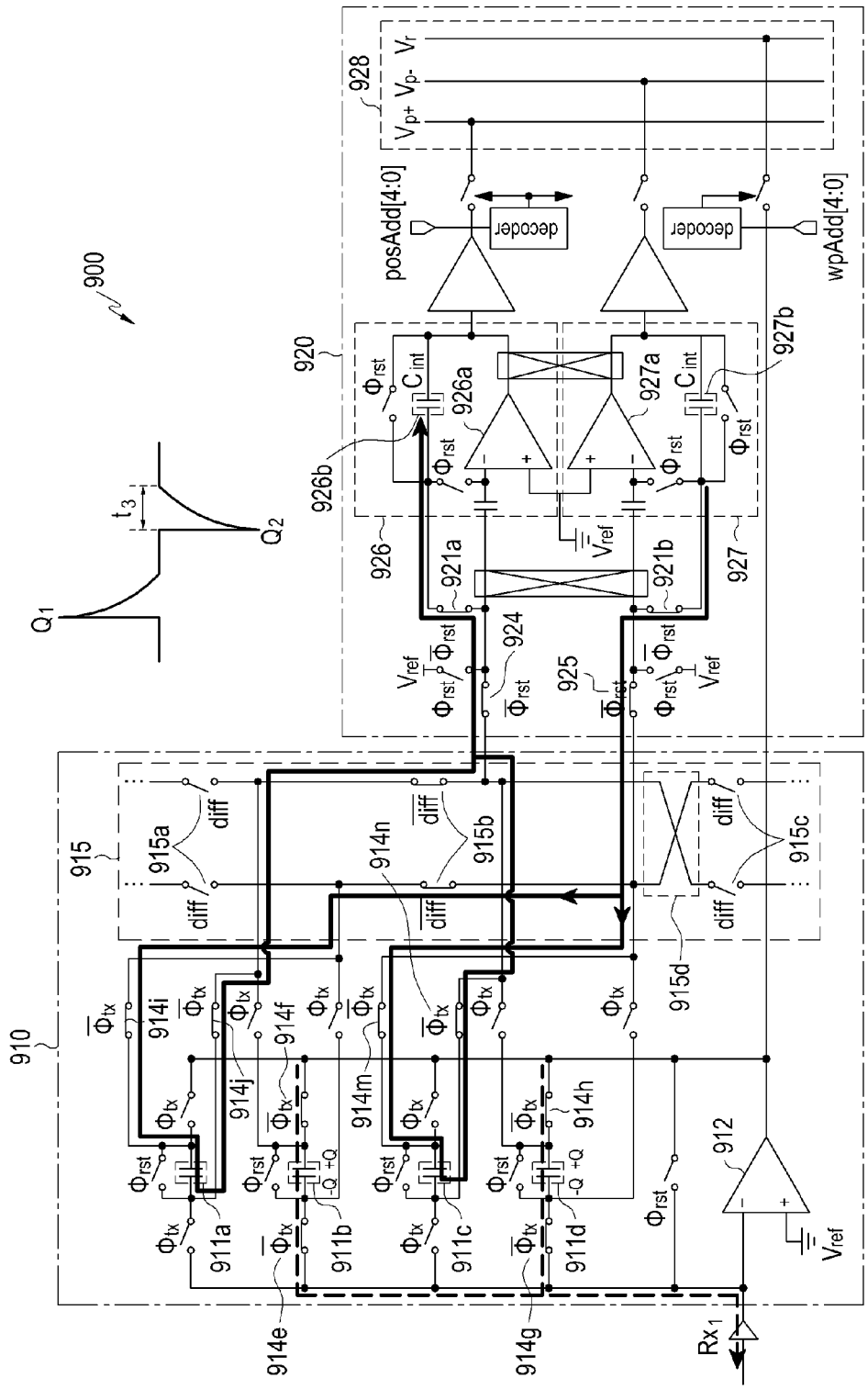

Referring to FIG. 9C, during a third time (e.g., in a case where a phase of the transmission signal corresponds to (c) in FIG. 4) according to an embodiment of the present disclosure, a negative charge corresponding to the falling edge of the transmission signal may be input to the demodulation circuit 910. During the third time according to an embodiment of the present disclosure, as soon as a charge is accumulated in the second feedback capacitor 911b and the fourth feedback capacitor 911d as $\overline{\varphi}$tx switches 914e, 914f, 914g, 914h, 914i, 914j, 914m and 914n are closed (i.e., short-circuited), the charge accumulated in the first feedback capacitor 911a and the third feedback capacitor 911c may be controlled by the controller so as to be output. In a second integrator 927 of the accumulation circuit 920, as shown in FIG. 9C, a positive charge may be output to offset the negative charge accumulated in the first feedback capacitor 911a and the third feedback capacitor 911c of the demodulation circuit 910. Further, the positive charge accumulated in the first feedback capacitor 911a and the third feedback capacitor 911c may be accumulated in a first integrator 926 of the accumulation circuit 920. Therefore, the positive and negative charges accumulated at both ends of the first feedback capacitor 911a and the third feedback capacitor 911c may be accumulated in the first integrator 926 and the second integrator 927 of the accumulation circuit 920.

Through the above-described function/functions or operation/operations, the charges accumulated in the first feedback capacitor 911a and the third feedback capacitor 911c may be output to the accumulation circuit 920.

For convenience of description of the reception circuit 900 according to another embodiment of the present disclosure, the switches 914e, 914f, 914g and 914h may be referred to as a second switching unit 914e, 914f, 914g and 914h.

Charges −Q and +Q may be accumulated at both ends of the second feedback capacitor 911b and the fourth feedback capacitor 911d.

In this way, charges having different parity properties may be controlled by the controller so as to be accumulated in each of the first feedback capacitor 911a and the third feedback capacitor 911c (or a first group capacitor), and the second feedback capacitor 911b and the fourth feedback capacitor 911d (or a second group capacitor).

Figure 9D:
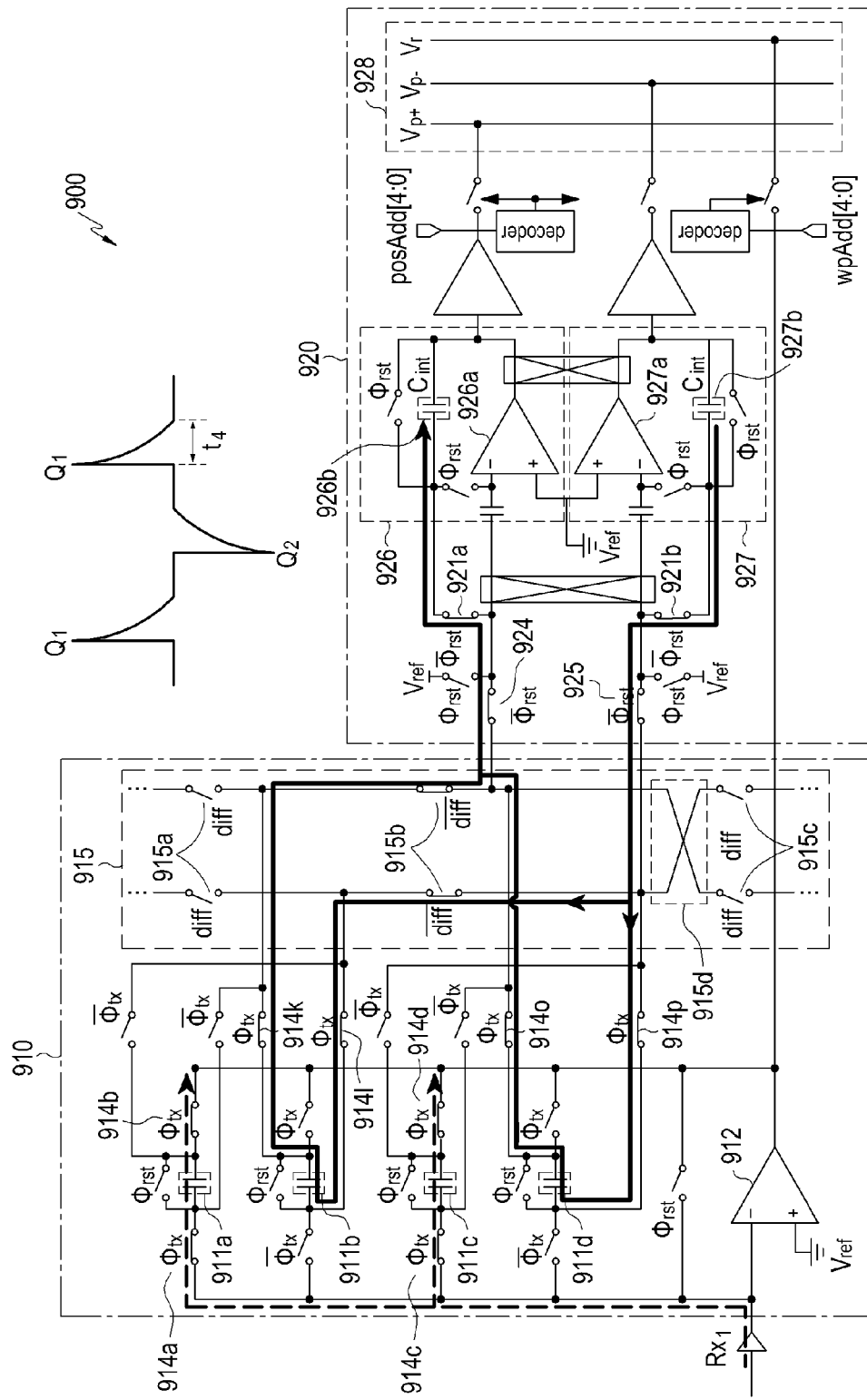

Referring to FIG. 9D, during a fourth time (e.g., in a case where a phase of the transmission signal corresponds to (d) in FIG. 4) according to an embodiment of the present disclosure, as soon as the charges accumulated in the second feedback capacitor 911b and the fourth feedback capacitor 911d are output, charges may be controlled by the controller so as to be accumulated in the first feedback capacitor 911a and the third feedback capacitor 911c. During the fourth time, the controller may control Φtx switches 914a, 914b, 914c, 914d, 914k, 914l, 914o and 914p so as to be closed (i.e., short-circuited). The charge/charges output by the second feedback capacitor 911b and the fourth feedback capacitor 911d may be accumulated in a capacitor 926b of the first integrator 926 and a capacitor 927b of the second integrator 927 in the accumulation circuit 920 for a predetermined time. Charges +Q and −Q may be accumulated at both ends of the first feedback capacitor 911a and the third feedback capacitor 911c. In the second integrator 927 of the accumulation circuit 920, as shown in FIG. 9D, a positive charge may be output to offset the negative charge accumulated in the second feedback capacitor 911b and the fourth feedback capacitor 911d of the demodulation circuit 910. Further, the positive charge accumulated in the second feedback capacitor 911b and the fourth feedback capacitor 911d may be accumulated in the first integrator 926 of the accumulation circuit 920. Therefore, the positive and negative charges accumulated at both ends of the second feedback capacitor 911b and the fourth feedback capacitor 911d may be accumulated in the first integrator 926 and the second integrator 927 of the accumulation circuit 920.

The controller may repeatedly perform the function/functions or operation/operations described with reference to FIGS. 6B to 6D, a predetermined number of times (e.g., 30 times). After repeating the function/functions or operation/operations, if it reaches a fifth time (e.g., a case where a phase of the transmission signal corresponds to (e) in FIG. 4) according to an embodiment of the present disclosure, the controller may output the signal accumulated in the first integrator 926 and the second integrator 927.

The accumulation circuit 920 may include a signal output unit 928 for outputting the charges accumulated in the first integrator 926 and the second integrator 927.

The controller may output, through the signal output unit 928, the signal accumulated in any one accumulation circuit among accumulation circuits included in a plurality of channels. The any one accumulation circuit for outputting the accumulated signal may be selected by the controller. The accumulation circuit 920 may include a structure for accumulating the signal input to the accumulation circuit 920 in, for example, two capacitors (e.g., the capacitors 926b and 927b) as opposing parities. Thus, if sensing a difference (e.g., (Vp+)-(Vp−)) between the signals output from the signal output unit 928, the accumulation circuit 920 may obtain a signal having a double magnitude compared with when outputting the signals using one integrator. Further, the demodulation circuit 910 may accumulate the reception signal corresponding to the rising edge and falling edge of the transmission signal in different capacitors (e.g., the first feedback capacitor 911a and the second feedback capacitor 911b), and then accumulate the reception signal in the capacitors 926b and 927b of the accumulation circuit 920 as different parities. On the other hand, since the low-frequency noise that is introduced in the reception channel is an electrical signal that varies slowly regardless of the transmission signal, the low-frequency noise may be equally accumulated in different capacitors (e.g., the first feedback capacitor 911a and the second feedback capacitor 911b) regardless of the rising edge and falling edge of the transmission signal, and then accumulated in the capacitors 926b and 927b of the accumulation circuit 920 as different parities, so they may be offset from each other in the capacitors 926b and 927b of the accumulation circuit 920, making it possible to obtain the high SNR.

FIGS. 10A to 10H illustrate a signal flow in a reception circuit in a differential mode related to cancellation of the noise according to another embodiment of the present disclosure.

Figure 10A:
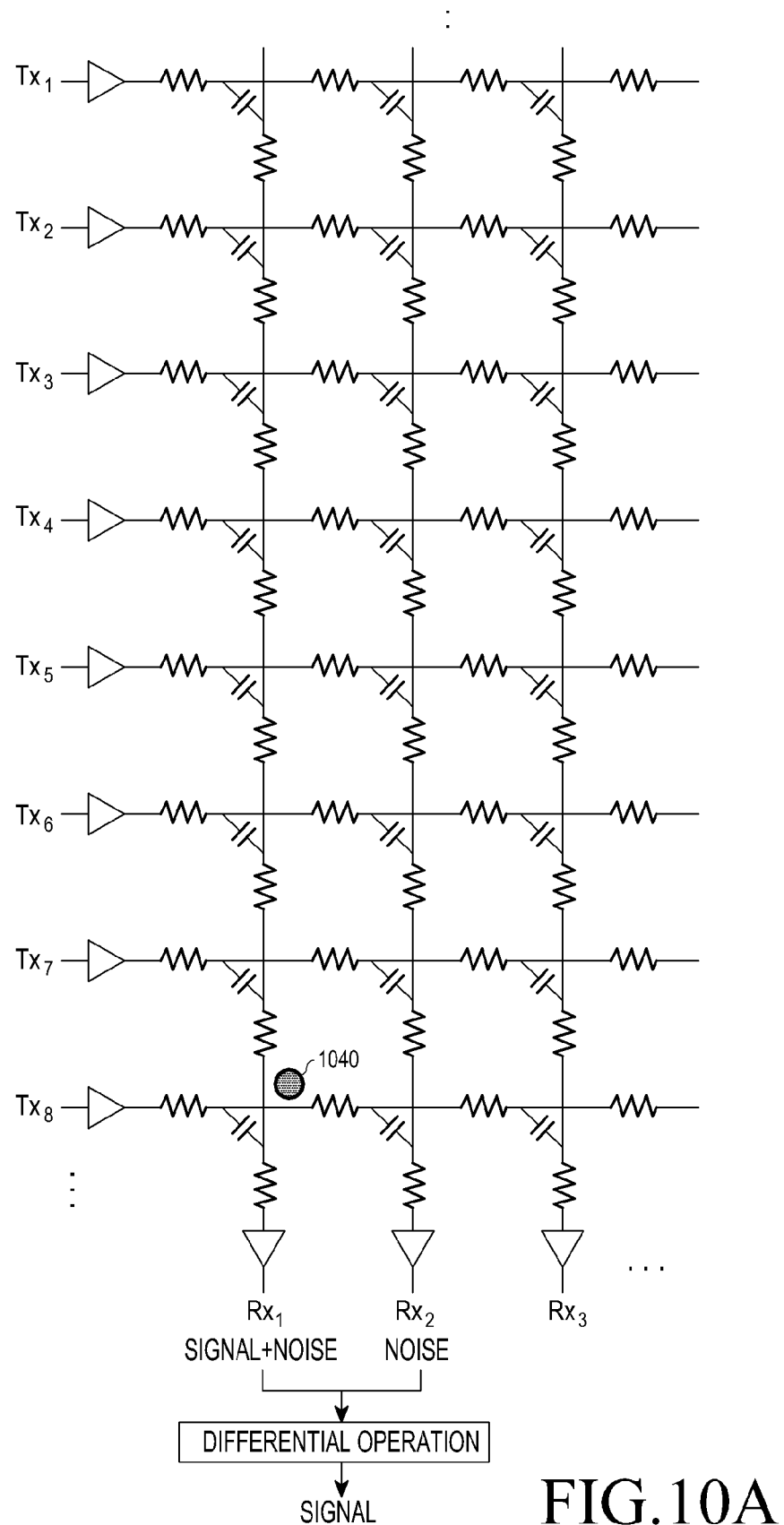
FIGS. 10A, 10B, 10C, 10D, 10E, 10F, 10G, and 10H illustrate a signal flow in a reception circuit in a second mode (e.g., a differential mode) related to cancellation of the noise according to another embodiment of the present disclosure.

Referring to FIG. 10A, if a user's touch input 1040 is made, not only the signal that is input in response to a transmission signal, but also the noise generated in a display (e.g., the touch screen panel 210) may be input to a reception circuit (e.g., a reception circuit 1000a) at the same time.

On the other hand, while a signal change caused by the user's touch input 1040 is limited to the touch point (e.g., a channel Rx1, which will be referred to as a 'first channel' as needed), the noise generated by driving of the display may be introduced in a similar fashion in all channels included in the display. The differential mode may be a mode for outputting only the signal regarding the touch input 1040 by cancelling the noise through a differential operation of obtaining a difference between signals received at the first channel and a channel (e.g., a channel Rx2, which will be referred to as a 'second channel' as needed) adjacent to the first channel.

Figure 10B:
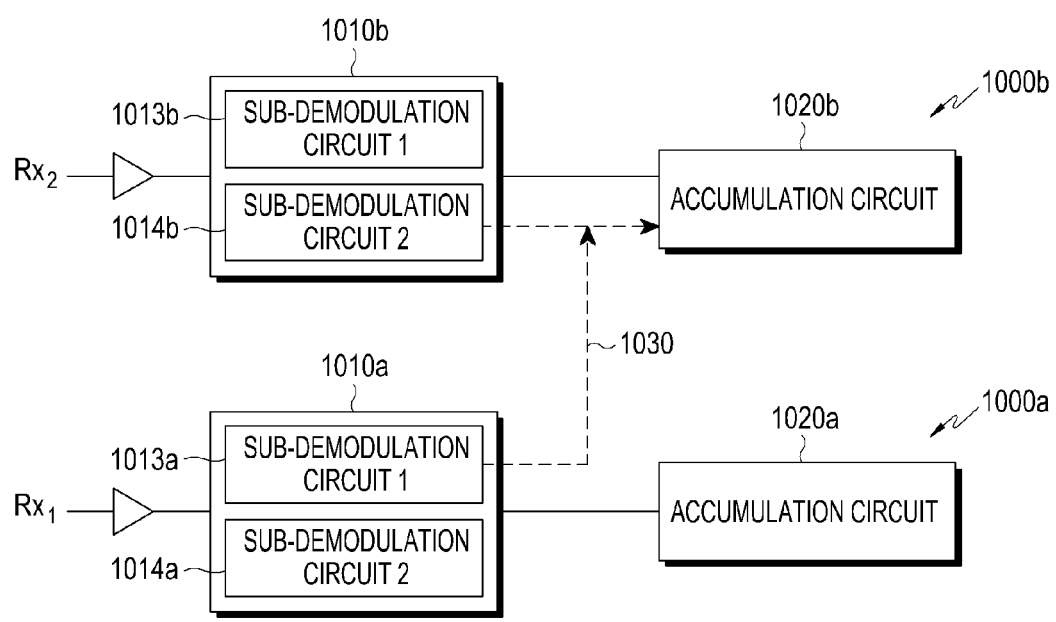

Referring to FIG. 10B, the differential operation may be performed based on the signals that are input to a sub-demodulation circuit (e.g., a first sub-demodulation circuit 1013a) of the first channel, to which a signal corresponding to the touch input 1040 is input, and to a sub-demodulation circuit (e.g., a second sub-demodulation circuit 1014b) of the second channel. To this end, the touch input signal corresponding to the touch input 1040 and a signal regarding the noise may be transmitted to the second channel as indicated by reference numeral 1030 in FIG. 10B. The touch input signal and the noise signal that are transmitted to a reception circuit 1000b of the second channel may be transmitted to an accumulation circuit 1020b of the second channel. The accumulation circuit 1020b may calculate a difference between the signal received at the first sub-demodulation circuit 1013a of the first channel and the signal received at the second sub-demodulation circuit 1014b of the second channel, and accumulate the calculated difference. In accordance with various embodiments of the present disclosure, the function or operation of the differential operation may be performed by a controller (e.g., the controller 230).

Figure 10C:
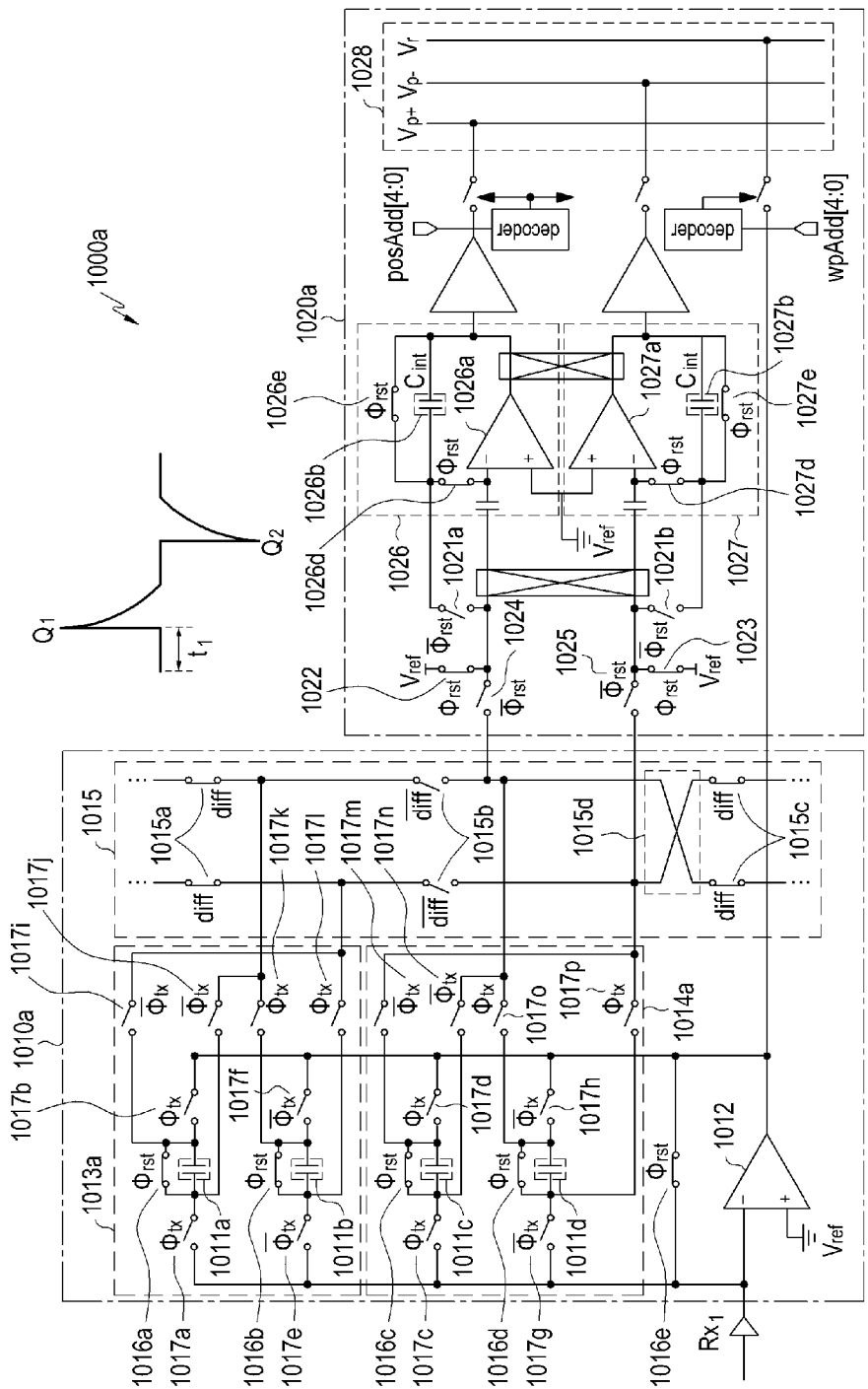

Referring to FIG. 10C, during a first time (e.g., in a case where a phase of the transmission signal corresponds to (a) in FIG. 4) according to an embodiment of the present disclosure, Φrst switches (e.g., reset switches 1016a, 1016b, 1016c, 1016d, 1016e, 1022, 1023, 1026d, 1026e, 1027d and 1027e) may be controlled by the controller (e.g., the controller 230) so as to be closed (i.e., short-circuited) for a predetermined time, so that an operational amplifier 1012 and first to fourth feedback capacitors 1011a, 1011b, 1011c and 1011d may be controlled to be reset. If the reset is completed, the Φrst switches may be controlled to be opened and $\overline{\varphi}$rst switches 1021a, 1021b, 1024 and 1025 may be controlled to be closed (i.e., short-circuited), for accumulation of a signal.

The reception circuits 1000a and 1000b according to other embodiments of the present disclosure may include a mode selector 1015. For a differential-mode operation, a switch 1015b of the mode selector 1015 may be controlled to be opened, and switches 1015a and 1015c may be controlled to be closed (i.e., short-circuited).

Figure 10D:
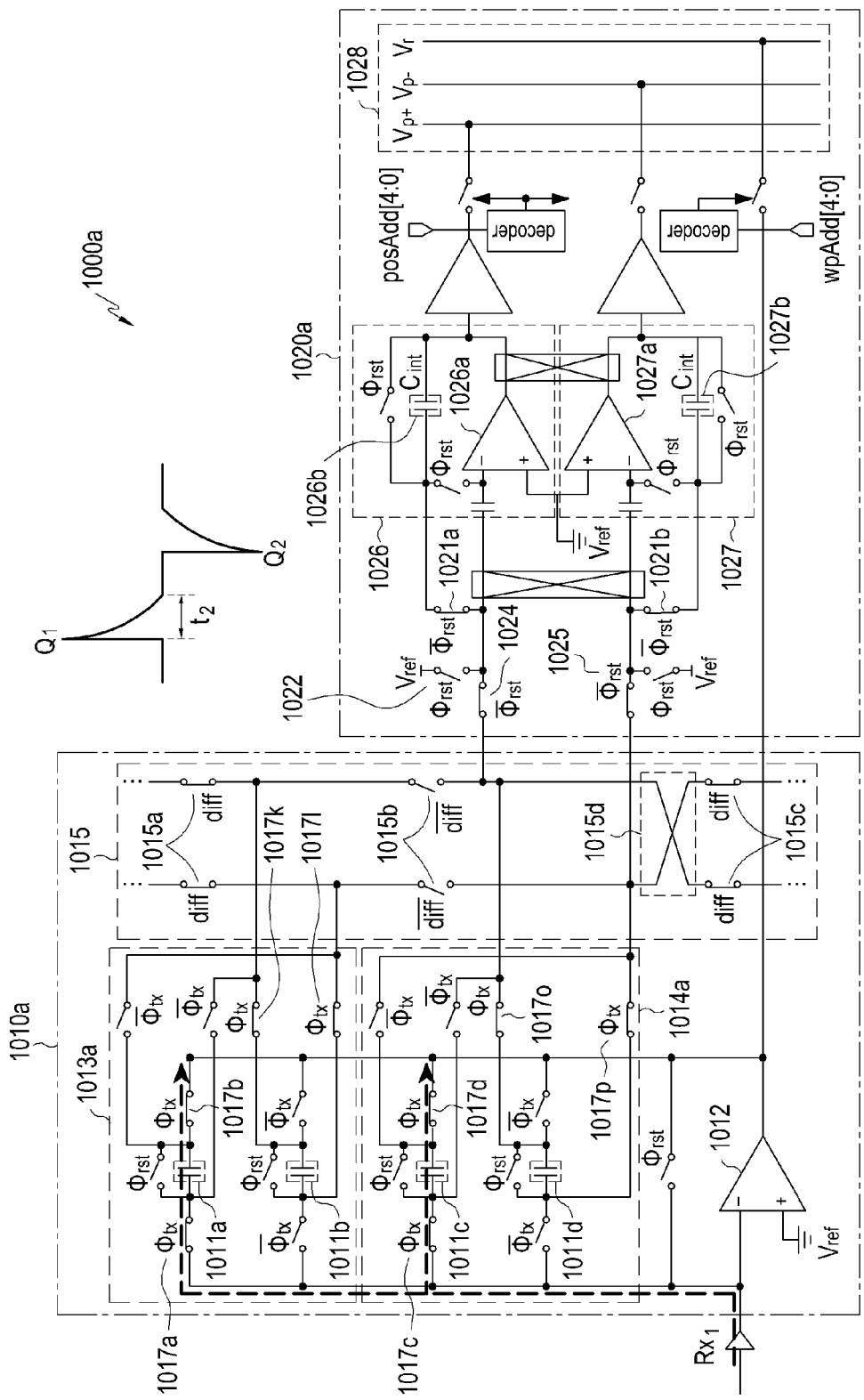

Referring to FIG. 10D, during a second time (e.g., in a case where a phase of the transmission signal corresponds to (b) in FIG. 4) according to an embodiment of the present disclosure, a positive charge corresponding to the rise of a voltage may be input to a demodulation circuit 1010a of the first channel. During the second time according to an embodiment of the present disclosure, Φtx switches 1017a, 1017b, 1017c, 1017d, 1017k, 1017l, 1017o and 1017p may be controlled by the controller so as to be closed (i.e., short-circuited). Therefore, charges +Q and −Q corresponding to the rise of a voltage may be accumulated at both ends of the first feedback capacitor 1011a and the third feedback capacitor 1011c according to the input signal. If necessary, the switches 1017a, 1017b, 1017c and 1017d may be referred to as a first switching unit 1017a, 1017b, 1017c and 1017d.

For convenience of description of the differential mode according to an embodiment of the present disclosure, in a description of FIGS. 10E to 10H, only the function/functions or operation/operations performed by the first sub-demodulation circuit 1013a of the first channel and the second sub-demodulation circuit 1014b of the second channel will be described. A first sub-demodulation circuit 1013b of the second channel may be controlled to perform the same function/functions or operation/operations as described below in terms of the relationship with adjacent another channel (e.g., a channel Rx3).

Figure 10E:
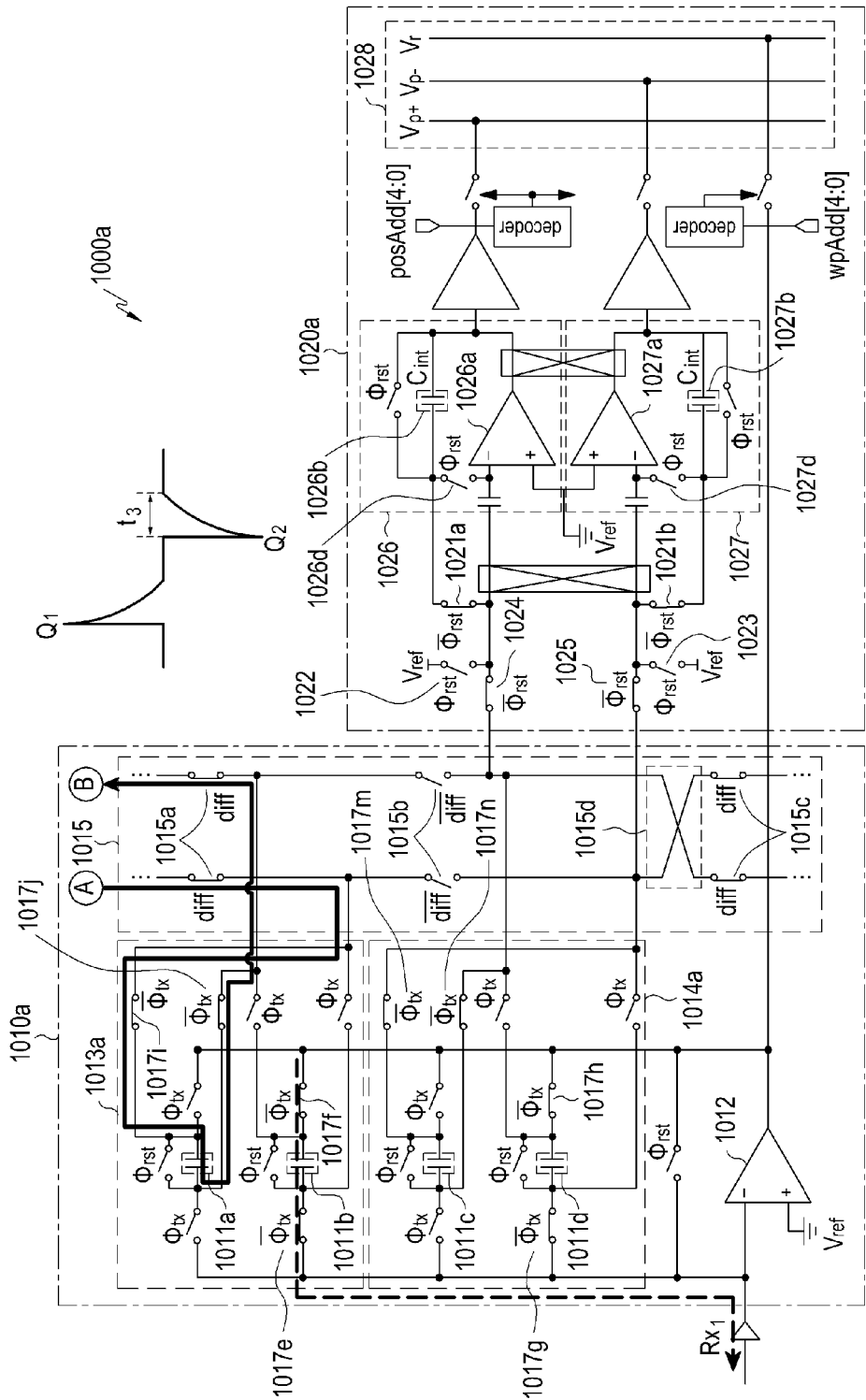

Referring to FIG. 10E, during a third time (e.g., in a case where a phase of the transmission signal corresponds to (c) in FIG. 4) according to an embodiment of the present disclosure, a negative charge corresponding to the decrease in voltage may be input to the demodulation circuit 1010a of the first channel. During the third time, as soon as the negative charge is accumulated in the second feedback capacitor 1011b of the demodulation circuit 1010a as switches 1017e and 1017f are closed (i.e., short-circuited), the charge accumulated in the first feedback capacitor 1011a may be controlled by the controller so as to be output. The output charge may be transmitted to the second channel adjacent to the first channel.

Figure 10F:
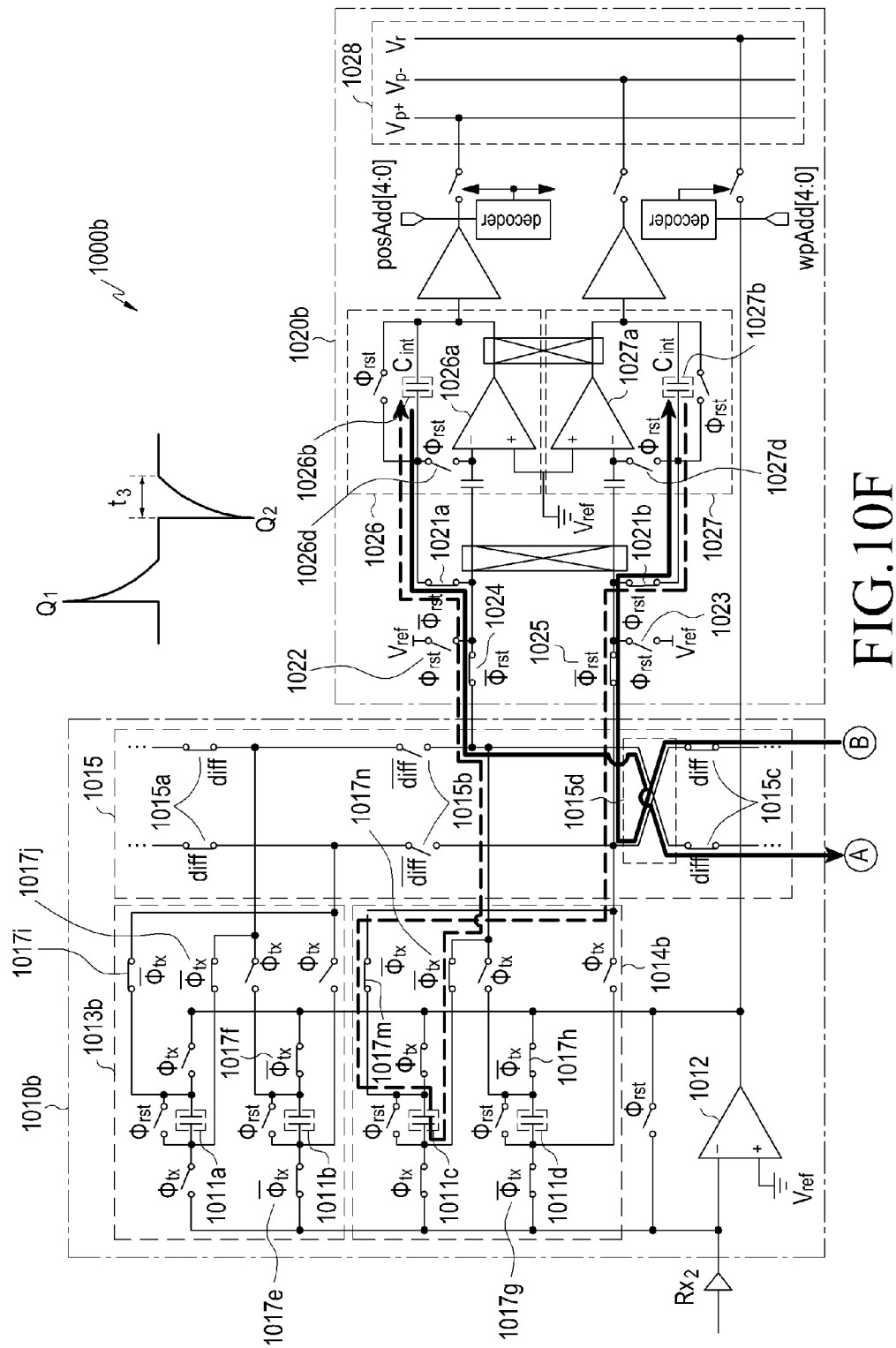

Referring to FIG. 10F, the charge transmitted to the second channel may be transmitted to the accumulation circuit 1020b of the second channel, and then accumulated in a capacitor 1026b and a capacitor 1027b, as shown in FIG. 10F. The function or operation in which the charge transmitted to the second channel is accumulated in the accumulation circuit 1020b of the second channel may be performed after the parities are changed by a cross unit 1015d included in the mode selector 1015 for the first and second channels. Through the cross unit 1015d, the signal transmitted from the first channel may be configured to be accumulated in the accumulation circuit in the opposite direction to the signal received from the second channel. Therefore, in the differential mode, it is possible to offset the noise that is introduced in common as a difference between the signals received at the first channel and the second channel is accumulated.

Figure 10G:
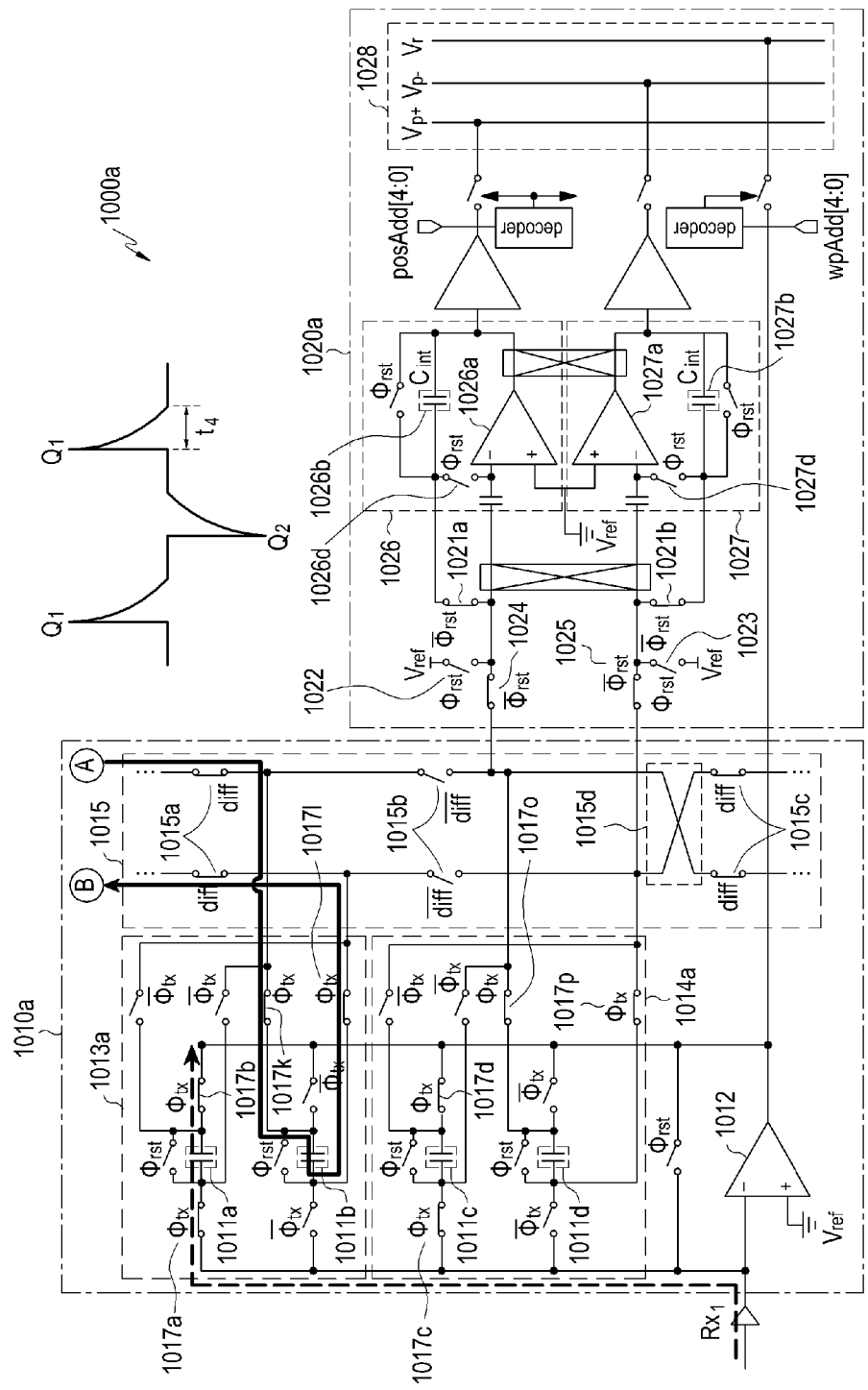

Referring to FIG. 10G, during a fourth time (e.g., in a case where a phase of the transmission signal corresponds to (d) in FIG. 4) according to an embodiment of the present disclosure, as soon as the charges accumulated in the second feedback capacitor 1011b are output, charges corresponding to the transmission driving signal may be controlled by the controller so as to be accumulated in the first feedback capacitor 1011a. The charges output from the second feedback capacitor 1011b may be transmitted to the second channel adjacent to the first channel.

Figure 10H:
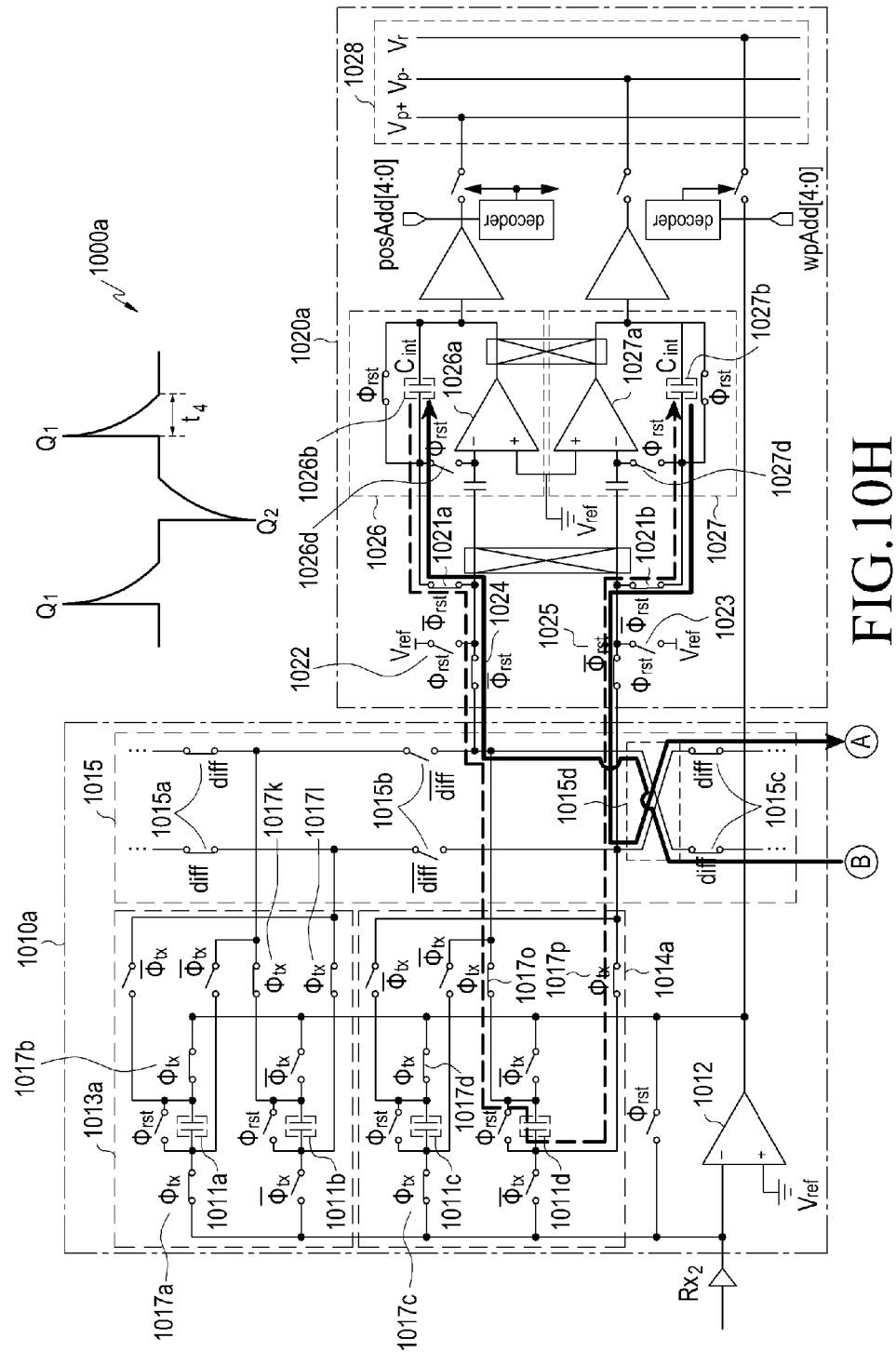

Referring to FIG. 10H, during the fourth time, the charge that is output from the first channel and transmitted to the second channel may be accumulated in the capacitor 1026b and the capacitor 1027b in the accumulation circuit 1020b of the second channel. Since the function or operation, in which the charge transmitted from the first channel to the second channel is accumulated in the accumulation circuit 1020b of the second channel, is performed through the cross unit 1015d included in the mode selector 1015 for the first and second channels, the charge may be accumulated with different parities from those of the capacitor 1011d of the second channel. Therefore, a difference between signals received at two channels is accumulated in the accumulation circuit, and the noise that is introduced in common may be offset from each other.

The controller may repeatedly perform the function/functions or operation/operations described with reference to FIGS. 10D to 10H, a predetermined number of times (e.g., 30 times). After repeating the function/functions or operation/operations, if it reaches a fifth time (e.g., a case where a phase of the transmission signal corresponds to (e) in FIG. 4) according to an embodiment of the present disclosure, the controller may output the signal accumulated in a first integrator 1026 and a second integrator 1027.

Figure 11:
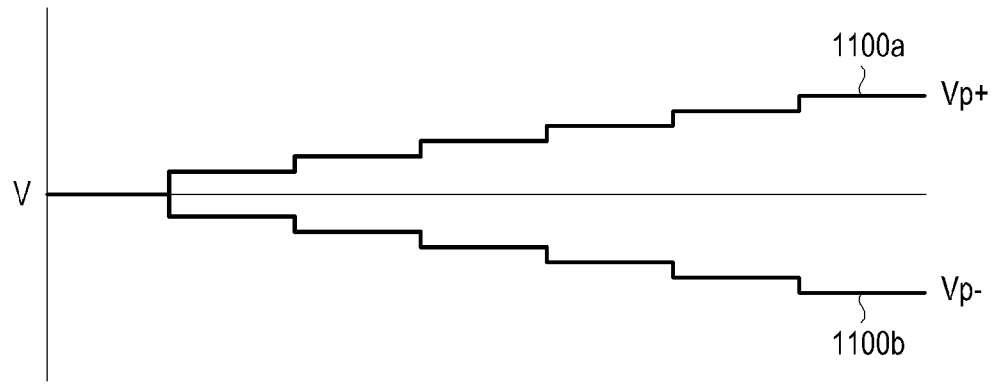
FIG. 11 illustrates a function or operation of repeatedly accumulating a signal related to a touch input for a predetermined time in response to the touch input by a reception circuit according to another embodiment of the present disclosure.

FIG. 11 illustrates a function or operation of repeatedly accumulating a signal related to a touch input for a predetermined time in response to the touch input by a reception circuit according to another embodiment of the present disclosure.

Referring to FIG. 11, if a transmission signal is input, accumulation of a signal is repeatedly performed for a predetermined time or a predetermined number of times in an accumulation circuit (e.g., the accumulation circuit 920) according to an embodiment of the present disclosure, as indicated by reference numerals 1100a and 1100b in FIG. 11, thereby improving the sensitivity of the touch input, making it possible to more accurately sense a touch input.

As is apparent from the foregoing description, according to the above-described present disclosure, it is possible to effectively cancel the noise while minimizing the size of a reception circuit electrically connected to a touch screen panel, using a plurality of capacitors connected to one operational amplifier.

According to the above-described present disclosure, it is possible to quickly cancel the noise through an operation in which accumulation and output of a signal for a capacitor included in a reception circuit are performed at same time.

According to the above-described disclosure, it is possible to effectively cancel the noise through a differential operation regarding the noise between adjacent channels.

It will be apparent to those of ordinary skill in the art that the effects of the present disclosure are not limited to the above-described effects, and various other effects are inherent in this specification.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A touch sensing device for measuring a contact position of an object by measuring a change in capacitance caused by contact of an object, the touch sensing device comprising:
   a touch screen panel on which channel electrodes functioning as a transmission antenna or a reception antenna are disposed to form a plurality of electrode patterns;
   a transmission circuit connected to the channel electrodes and configured to apply an electrical signal to the touch screen panel;
   a reception circuit connected to the channel electrodes and configured to sense a varying capacitance from the plurality of electrode patterns; and
   a controller configured to control the touch screen panel, the transmission circuit and the reception circuit,
   wherein the reception circuit includes a demodulation circuit,
   wherein the demodulation circuit includes an operational amplifier and a plurality of feedback capacitors electrically connected to the operational amplifier,
   wherein charges relating to signals having different parity properties are controlled by the controller so as to be accumulated in each of a first group capacitor and a second group capacitor among the plurality of feedback capacitors,
   wherein the demodulation circuit further includes a first switch which selectively connects the first group capacitor to a first ground and a second switch which selectively connects the second group capacitor to a second ground,
   wherein the controller is further configured to control the first switch to connect the first group capacitor and the first ground and control the second switch to disconnect the second group capacitor and the second ground for a first time period, and
   wherein the controller is further configured to control the first switch to disconnect the first group capacitor and the first ground and control the second switch to connect the second group capacitor and the second ground for a second time period.

2. The touch sensing device of claim 1, wherein the reception circuit further includes an accumulation circuit configured to accumulate an output signal of the feedback capacitor.

3. The touch sensing device of claim 2,
   wherein the accumulation circuit includes a first integrator and a second integrator, and
   wherein both ends of each of the plurality of feedback capacitors are connected to input ends of the first integrator and the second integrator, respectively.

4. The touch sensing device of claim 3, wherein each of the first integrator and the second integrator includes an operational amplifier and a capacitor.

5. The touch sensing device of claim 3, wherein the reception circuit is further configured to detect a difference between values output by the first integrator and the second integrator.

6. The touch sensing device of claim 3, wherein the accumulation circuit is further configured to receive signals output by a plurality of capacitors included in the demodulation circuit and accumulate the received signals in a same capacitor in the accumulation circuit.

7. The touch sensing device of claim 2, wherein the accumulation circuit is further configured to receive signals output by a plurality of capacitors included in the demodulation circuit connected to the different channel electrodes to detect a difference between magnitudes of signals output by the different channel electrodes.

8. The touch sensing device of claim 1, wherein while any one group capacitor among the first group capacitor and the second group capacitor is accumulating charges, another group capacitor is controlled by the controller so as to output accumulated charges.

9. The touch sensing device of claim 1,
wherein the first group capacitor includes a first feedback capacitor and a third feedback capacitor for accumulating charges relating to signals having positive parity properties, and
wherein the second group capacitor includes a second feedback capacitor and a fourth feedback capacitor for accumulating charges relating to signals having negative parity properties.

10. The touch sensing device of claim 9,
wherein the first feedback capacitor and the third feedback capacitor have the same capacitance, and
wherein the second feedback capacitor and the fourth feedback capacitor have the same capacitance.

11. The touch sensing device of claim 9, wherein the first to fourth capacitors have the same capacitance.

12. The touch sensing device of claim 9, wherein the accumulation circuit accumulates a difference between charges accumulated in feedback capacitors that receive signals with the same parity from different channel electrodes, or a sum of charges accumulated in feedback capacitors that receive signals with different parities from different channel electrodes.

13. The touch sensing device of claim 9, wherein both ends of each of the first to fourth feedback capacitors are electrically connected to input ends of a first integrator and a second integrator included in the accumulation circuit.

14. A touch sensing device for measuring a contact position of an object by measuring a change in capacitance caused by contact of an object, the touch sensing device comprising:
a touch screen panel on which channel electrodes functioning as a transmission antenna or a reception antenna are disposed to form a plurality of electrode patterns;
a transmission circuit connected to the channel electrodes and configured to apply an electrical signal to the touch screen panel;
a reception circuit connected to the channel electrodes and configured to sense a varying capacitance from the plurality of electrode patterns, wherein the reception circuit includes a demodulation circuit that includes an operational amplifier and a plurality of feedback capacitors electrically connected to the operational amplifier, and an accumulation circuit that includes a first integrator that includes a first capacitor and a second integrator that includes a second capacitor; and
a controller connected to the touch screen panel, the transmission circuit and the reception circuit,
wherein the controller is configured to:
accumulate charges relating to signals having different parity properties in each of a first feedback capacitor and a second feedback capacitor among the plurality of feedback capacitors,
output the accumulated charges to the accumulation circuit, and
detect a contact position on the touch screen based on charges accumulated in the accumulation circuit,
wherein the first capacitor is charged by charges which are output from the first feedback capacitor corresponding to a first channel electrode and another second feedback capacitor corresponding to a second channel electrode,
wherein the second capacitor is charged by charges which are output from the second feedback capacitor corresponding to the first channel and another first feedback capacitor corresponding to the second channel, and
wherein the first capacitor is charged by a positive signal from the transmission circuit and the second capacitor is charged by a negative signal from the transmission circuit.

* * * * *